United States Patent
Hong et al.

(10) Patent No.: US 10,101,947 B2
(45) Date of Patent: Oct. 16, 2018

(54) STORAGE DEVICE CONFIGURED TO MANAGE PLURAL DATA STREAMS BASED ON DATA AMOUNT

(71) Applicant: Samsung Electronics Co., Ltd., Suwon-si, Gyeonggi-do (KR)

(72) Inventors: Du-Won Hong, Osan-si (KR); Moonsung Choi, Seongnam-si (KR); Alain Tran, Hwaseong-si (KR); Moonwook Oh, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 49 days.

(21) Appl. No.: 15/227,947

(22) Filed: Aug. 3, 2016

(65) Prior Publication Data

US 2017/0060479 A1    Mar. 2, 2017

(30) Foreign Application Priority Data

Aug. 31, 2015  (KR) ........................ 10-2015-0122912

(51) Int. Cl.
  *G06F 12/00*  (2006.01)
  *G06F 3/06*  (2006.01)
(52) U.S. Cl.
  CPC .......... *G06F 3/0659* (2013.01); *G06F 3/0604* (2013.01); *G06F 3/0679* (2013.01); *G06F 3/067* (2013.01)
(58) Field of Classification Search
  None
  See application file for complete search history.

(56) References Cited

U.S. PATENT DOCUMENTS

| 7,051,182 | B2 * | 5/2006 | Blumenau ............. G06F 3/0605 709/213 |
| 7,568,075 | B2 | 7/2009 | Fujibayashi et al. |
| 7,679,133 | B2 | 3/2010 | Son et al. |
| 8,069,318 | B2 | 11/2011 | Karabatsos |
| 8,364,884 | B2 | 1/2013 | Nagadomi |
| 8,553,466 | B2 | 10/2013 | Han et al. |

(Continued)

FOREIGN PATENT DOCUMENTS

KR    20120022065 A    3/2012

*Primary Examiner* — Brian Peugh
(74) *Attorney, Agent, or Firm* — Renaissance IP Law Group LLP

(57) ABSTRACT

A storage device includes one or more nonvolatile memories, and a memory controller that controls the nonvolatile memories such that write data of data streams is stored in the nonvolatile memories. The data streams have a first number of requested stream identifiers provided from a host. The memory controller includes a write amount manager that manages information about a data amount of each of the data streams having the requested stream identifiers, a stream manager that maps the first number of the requested stream identifiers with a second number of processing stream identifiers, depending on the information associated with the data amount, such that the data streams are provided to the nonvolatile memories according to the second number of processing stream identifiers, and a mapping manager that manages information about mapping between the first number of the requested stream identifiers and the second number of the processing stream identifiers.

18 Claims, 14 Drawing Sheets

(56) References Cited

U.S. PATENT DOCUMENTS

| | | | |
|---|---|---|---|
| 8,559,235 B2 | 10/2013 | Yoon et al. | |
| 8,654,587 B2 | 2/2014 | Yoon et al. | |
| 8,667,212 B2 | 3/2014 | McWilliams et al. | |
| 8,838,873 B2 | 9/2014 | Giganti et al. | |
| 8,949,626 B2 * | 2/2015 | Asnaashari | G06F 21/78 711/173 |
| 9,043,531 B2 | 5/2015 | Calvert et al. | |
| 2003/0126396 A1 * | 7/2003 | Camble | G06F 3/0601 711/173 |
| 2007/0067559 A1 | 3/2007 | Fujibayashi et al. | |
| 2007/0277007 A1 | 11/2007 | Nakayama et al. | |
| 2009/0121271 A1 | 5/2009 | Son et al. | |
| 2010/0017562 A1 | 1/2010 | Nagadomi | |
| 2011/0185109 A1 | 7/2011 | Karabatsos | |
| 2011/0216603 A1 | 9/2011 | Han et al. | |
| 2011/0233648 A1 | 9/2011 | Seol et al. | |
| 2012/0051143 A1 | 3/2012 | Yoon et al. | |
| 2012/0054420 A1 | 3/2012 | Kang et al. | |
| 2012/0110295 A1 * | 5/2012 | Matton | G06F 21/805 711/173 |
| 2012/0239852 A1 | 9/2012 | Calvert et al. | |
| 2012/0311246 A1 | 12/2012 | McWilliams et al. | |
| 2012/0324149 A1 | 12/2012 | Giganti et al. | |
| 2013/0060993 A1 | 3/2013 | Park et al. | |
| 2013/0067164 A1 * | 3/2013 | Velayudhan | G06F 13/12 711/114 |
| 2013/0198489 A1 | 8/2013 | Branson et al. | |
| 2013/0279262 A1 | 10/2013 | Yoon et al. | |
| 2015/0113203 A1 | 4/2015 | Dancho et al. | |
| 2016/0140618 A1 * | 5/2016 | Duggal | G06Q 30/0269 705/14.66 |

\* cited by examiner

STORAGE DEVICE CONFIGURED TO MANAGE PLURAL DATA STREAMS BASED ON DATA AMOUNT

CROSS-REFERENCE TO RELATED APPLICATIONS

The present application claims priority under 35 U.S.C. § 119 to Korean Patent Application No. 10-2015-0122912 filed on Aug. 31, 2015, in Korean Intellectual Property Office, the entire contents of which are incorporated herein by reference.

TECHNICAL FIELD

Example embodiments of the present disclosure described herein relate to a storage device, and more particularly, relate to configurations and operations of a storage device capable of transmitting and storing write data through a plurality of data streams.

DESCRIPTION OF THE RELATED ART

Nowadays, various kinds of electronic devices are being used. Storage devices are an example of one kind of an electronic device. The storage devices may store data. Usually a storage device is associated with a host, such as a host processor or host computer. The storage device may store data received from a host, or may transmit the stored data to the host in response to a request from the host. Various services may be provided to a user based on operations of the storage device.

Many storage devices include a nonvolatile storage medium, and data stored in such storage devices is permanently or semi-permanently stored regardless of whether the storage devices are powered by a power supply. In recent years, the storage devices have been manufactured to include an electrically operating storage medium such as a semiconductor memory, instead of a mechanically operating medium, such as a hard disk drive. The storage devices that include a semiconductor memory (e.g., a solid state drive (SSD)) are widely used in various fields because of their fast operation speed.

The storage devices that include the semiconductor memory perform their own functions according to operations of various circuits included therein. As the storage devices that include the semiconductor memory are widely used, a variety of methods have been proposed to enhance the performance or characteristic of circuits included in the storage devices or to improve operations of the storage devices.

SUMMARY

Example embodiments of the present disclosure may provide a storage device configured to transmit and store write data through a plurality of data streams. In the example embodiments, the storage device may manage mapping between stream identifiers (IDs) and merging data streams based on a data amount of each of the plurality of data streams.

In some example embodiments, a storage device may include one or more nonvolatile memories, and a memory controller configured to control the one or more nonvolatile memories such that write data of each of a plurality of data streams is stored in the one or more nonvolatile memories, each of the data streams being associated with a corresponding requested stream identifier from among a first number of requested stream identifiers provided from a host. The memory controller may include a write amount manager configured to manage information associated with a data amount of each of the data streams associated with the corresponding requested stream identifiers. The memory controller may further include a stream manager configured to map the first number of the requested stream identifiers to a second number of processing stream identifiers, based on the information associated with the data amount, such that the data streams are provided to the one or more nonvolatile memories according to the second number of the processing stream identifiers. The memory controller may further include a mapping manager configured to manage information associated with mapping between the first number of the requested stream identifiers and the second number of the processing stream identifiers.

In some example embodiments, a storage device may include one or more nonvolatile memories and a memory controller. The memory control may be configured to map R requested stream identifiers to P processing stream identifiers, based on a data amount of each of a plurality of data streams, each of the data streams being associated with a corresponding one of the R requested stream identifiers, the requested stream identifiers being provided from a host. The memory controller may further be configured to control the one or more nonvolatile memories such that write data of each of the data streams is stored in the one or more nonvolatile memories according to the P processing stream identifiers. In some embodiments, each of the R and the P is an integer greater than 1.

In some example embodiments, a storage device may include a memory controller configured to receive a plurality of data streams from a host. The storage device may further include one or more nonvolatile memories configured to store write data of each of the plurality of data streams. In some embodiments, when a number of the plurality of data streams is greater than a number of streams processed by the memory controller, the memory controller is further configured to merge some of the plurality of data streams into one data stream based on a data amount of each of the plurality of data streams.

Some embodiments may include a memory controller including a stream manager configured to receive write data from a host in the form of a plurality of data streams, each of the data streams being associated with a corresponding requested stream identifier. The memory controller may further include a write amount manager configured to determine a first data amount associated with a first data stream from among the plurality of data streams having a first requested stream identifier, and to determine a second data amount associated with a second data stream from among the plurality of data streams having a second requested stream identifier. In some embodiments, the stream manager is configured to map the first requested stream identifier and the second requested stream identifier to a single processing stream identifier based on the first data amount and the second data amount.

BRIEF DESCRIPTION OF THE DRAWINGS

The above and other features and advantages will become apparent from the following description with reference to the following figures, wherein like reference numerals refer to like parts throughout the various figures unless otherwise specified, and wherein.

DETAILED DESCRIPTION OF EMBODIMENTS

All the above-mentioned features and the following description are provided to assist in the understanding of the present disclosure. That is, the present disclosure should not be construed as limited to the "example" embodiments set forth herein, and may be embodied in different forms. The following embodiments are merely examples for fully disclosing the present invention, and are described to provide the inventive concepts to those skilled in the art. Therefore, if there are many ways to implement the components of the present disclosure, it will be understood that the present disclosure may be implemented with any one of the ways or any one of the similar things thereof.

If it is mentioned that any configuration includes/comprises specific component(s) or any process includes/comprises specific operation(s) in the present disclosure, this means that other component(s) or other operation(s) may be further included. That is, the terms used herein are only intended to describe the specific example embodiments, and are not intended to limit the scope of the present disclosure. Further, the examples described that are provided to assist in the understanding of the present disclosure include their complementary embodiments.

The terms used herein have the meanings in which those skilled in the art would generally understand. The terms commonly used are to be construed as the consistent meanings in the context of the present disclosure. In addition, the terms used herein should not be interpreted in an overly ideal or formal sense unless explicitly so defined herein. Hereinafter, example embodiments of the present disclosure will be described below with reference to the attached drawings.

Figure 1:
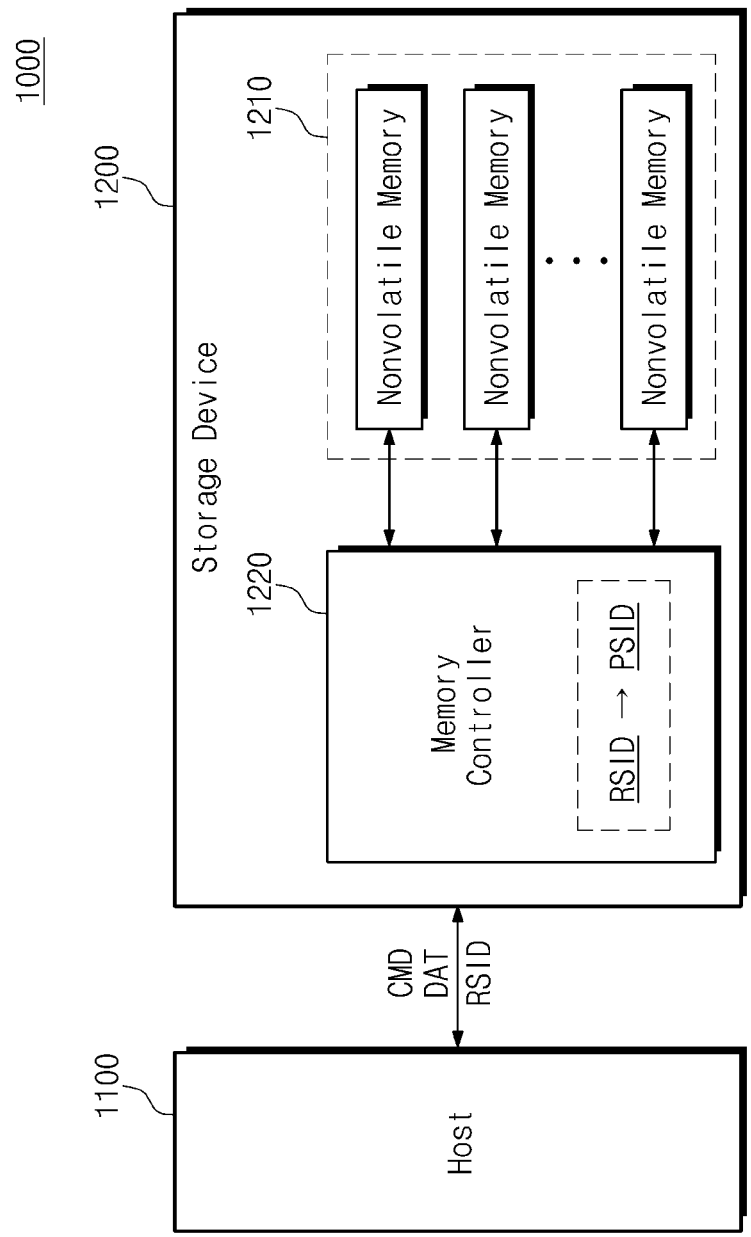
FIG. 1 is a block diagram illustrating a storage system including a storage device according to an example embodiment.

FIG. 1 is a block diagram illustrating a storage system 1000 including a storage device 1200 according to an example embodiment. The storage system 1000 may include a host 1100 and the storage device 1200.

The host 1100 may provide a command CMD to the storage device 1200. The host 1100 may exchange data DAT with the storage device 1200. For example, when the data DAT includes write data, the host 1100 may provide the storage device 1200 with the command CMD including a write command and the data DAT including the write data. For example, when the data DAT includes read data, the host 1100 may provide the command CMD including a read command to the storage device 1200, and may receive the data DAT including the read data from the storage device 1200. Accordingly, the storage system 1000 may provide a storage service to a user.

For example, the host 1100 may be implemented to include one or more processor cores. For example, the host 1100 may include a general-purposed processor, a special-purposed processor, an application processor, a microprocessor, or the like. The host 1100 may be a processor itself or an electronic device or system that includes a processor.

The storage device 1200 may include one or more nonvolatile memories 1210 and a memory controller 1220. Each of the nonvolatile memories 1210 may include a memory region for storing the data DAT provided from the host 1100. For example, when each of the nonvolatile memories 1210 include a NAND-type flash memory, each of the nonvolatile memories 1210 may include a memory cell array formed along a plurality of word lines and a plurality of bit lines. Such a configuration is described below with reference to FIGS. 13 and 14.

However, the present disclosure is not limited to the above example. Each of the nonvolatile memories 1210 may include one or more of various nonvolatile memories such as a phase-change random access memory (PRAM), a magneto-resistive RAM (MRAM), a resistive RAM (ReRAM), a ferroelectric RAM (FRAM), or the like. For the sake of explanation, it will be assumed that each of the nonvolatile memories 1210 includes a NAND flash memory in the following description. However, the configuration of each of the nonvolatile memories 1210 may be changed or modified in various ways.

The memory controller 1220 may control the overall operations of the storage device 1200. The memory controller 1220 may control the nonvolatile memories 1210. According to the control of the memory controller 1220, data stored in the nonvolatile memories 1210 may be provided to the host 1100, or data provided from the host 110 may be stored in the nonvolatile memories 1210.

In an example embodiment, the host 1100 may communicate with the memory controller 1220 in compliance with a protocol defined in the serial attached small computer system interface (SAS) specification. Communication based on the SAS specification may be performed using a plurality of data streams. The host 1100 may provide the storage device 1200 with the data DAT including the write data in the form of the plurality of data streams.

In the above example embodiment, the host 1100 may provide the storage device 1200 with data having the identical or similar characteristic through one data stream. On the other hand, the host 1100 may provide the storage device 1200 with several different data having different characteristics through different data streams. For example, system data may be transmitted to the storage device 1200 through one data stream separately from user data. By way of another example, several data generated at the same or almost same time may be transmitted to the storage device 1200 through one data stream. One or more characteristics of data may be managed in various ways based on the policy of the host 1100.

The storage device 1200 may store several different data provided through different data streams in different memory regions (e.g., different memory blocks) separately. On the other hand, the storage device 1200 may store data provided through one data stream in the same memory region together.

According to the above example embodiment, the data having the identical or similar characteristics may be managed together in the same memory region. Accordingly, the efficiency of allocating a new memory region (e.g., a new memory block) may be improved, and consequently, the performance of a write operation may be improved. In addition, the number of garbage collection operations to restore a page of invalid data and to secure a free page is reduced, and consequently, the life of the storage device 1200 may be slowly shortened. In other words, the overall life of the storage device 1200 may be lengthened since the aging of the storage device 1200 may be slowed down.

As described in the above example embodiment, the host 1100 may communicate with the memory controller 1220 in compliance with the protocol defined in the SAS specification. However, the present disclosure is not limited to the above example embodiment. The host 1100 may communicate with the memory controller 1220 in compliance with another protocol that is designed to transmit write data by means of a plurality of data streams. The host 1100 and the memory controller 1220 may employ one or more of various protocols that are designed to transfer write data by means of a plurality of data streams, to communicate with each other.

In some example embodiments, the host 1100 may allocate a requested stream identifier (RSID) to each of the data streams. The requested stream identifier may be an identifier (ID) that is allocated to each of the data streams by the host 1100 to identify each of the data streams. For example, the host 1100 may transmit write data having a first characteristic to the storage device 1200 through a data stream having a first requested stream identifier, and may transmit write data having a second characteristic to the storage device 1200 through a data stream having a second requested stream identifier.

The memory controller 1220 may receive a data stream having the requested stream identifier from the host 1100. The memory controller 1220 may map the requested stream identifier of the received data stream to a processing stream identifier (PSID). The processing stream identifier may be an identifier (ID) that is referred by the memory controller 1220 to store write data of each of the data streams in different memory regions (e.g., different memory blocks). For example, according to the control of the memory controller 1220, write data of a data stream having a first processing stream identifier may be stored in first memory region(s), and write data of a data stream having a second processing stream identifier may be stored in second memory region(s).

In the example embodiments of the present disclosure, the requested stream identifier may be mapped with the processing stream identifier based on a "data amount" of each of the data streams. Furthermore, write data of each of the data streams may be stored in at least one of the nonvolatile memories 1210 according to the processing stream identifier, not necessarily according to the requested stream identifier. Mapping between stream identifiers (i.e., RSIDs and PSIDs) and managing the data stream is described below with reference to FIGS. 2 to 12.

Figure 2:
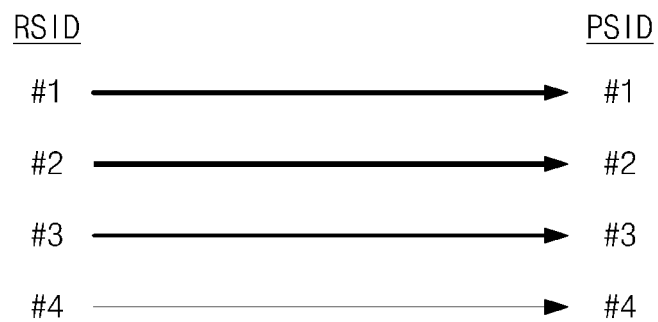
FIGS. 2 to 4 are conceptual diagrams illustrating a plurality of data streams transmitted in a storage system of FIG. 1.

FIG. 2 is a conceptual diagram illustrating a plurality of data streams transmitted in a storage system (e.g., 1000) of FIG. 1. Reference is now made to FIGS. 1 and 2.

In FIG. 2, one arrow denotes one data stream. A direction of an arrow indicates a mapping relationship between a requested stream identifier RSID and a processing stream identifier PSID. A thickness of an arrow indicates a data amount of a data stream. The thicker the thickness of an arrow is, the more a data amount of a data stream corresponding to the arrow is.

As used herein, a data amount may be a value obtained by accumulating a data size of a data stream having a particular requested stream identifier RSID during one or more measurement intervals. For example, when a data stream having a data rate of 100 megabytes (MB) per second is transmitted during a measurement interval of 5 seconds, the data amount of the data stream may have a value of 500 MB (i.e., 100 MB/second×5 seconds). Some example embodiments associated with the measurement interval and accumulating data sizes will be described with reference to FIGS. 8 to 12.

The host 1100 may provide data streams respectively having the first number (hereinafter referred to as "R") of requested stream identifiers RSIDs to the storage device 1200. The memory controller 1220 may process the second number (hereinafter referred to as "P") of data streams. Each of R and P may be an integer being greater than 1.

The memory controller 1220 may not be able to process more than P data streams due to limited resources of the storage device 1200. For example, a size (e.g., a scale) of the resources, such as a buffer capacity, an auxiliary power source (e.g., a capacitor) used to safely handle power failure (e.g., power loss), a circuit area, and the like, may be limited. Thus, the memory controller 1220 may process only the limited number of data streams.

For the sake of explanation, it will be assumed that four data streams respectively having four requested stream identifiers RSID #1 to RSID #4 are provided from the host 1100 to the storage device 1200. Furthermore, it will be assumed that the memory controller 1220 is capable of processing a maximum of four data streams, and that these four data streams have four processing stream identifiers PSID #1 to PSID #4, respectively. However, these assumptions are not intended to limit the present disclosure to only this example embodiment. The number of data streams and allocating stream identifiers RSID and PSID may be changed or modified in various ways without departing from the inventive concepts disclosed herein.

As illustrated in FIG. 2, in some cases, the host 1100 may provide the storage device 1200 with a number of data streams that the memory controller 1220 may be capable of processing simultaneously. In this case, four requested stream identifiers RSID #1 to RSID #4 may be respectively mapped with four processing stream identifiers PSID #1 to PSID #4, respectively, by the memory controller 1220. The memory controller 1220 may control storing write data of each of the four data streams according to the four processing stream identifiers PSID #1 to PSID #4.

When the number of data streams that are provided from the host 1100 is equal to the maximum number of data streams that may be processed by the memory controller 1220 (i.e., R=P), there may be no noticeable issue with mapping between the stream identifiers RSID and PSID, and no noticeable issue with storing write data. When the number of data streams that are provided from the host 1100 is less than the maximum number of data streams that may be processed by the memory controller 1220 (i.e., R<P), write data of each of the data streams may be stored without issue according to the PSIDs. For these cases, the limited resources of the storage device 1200 may be appropriately and successfully used without issue.

Figure 3:
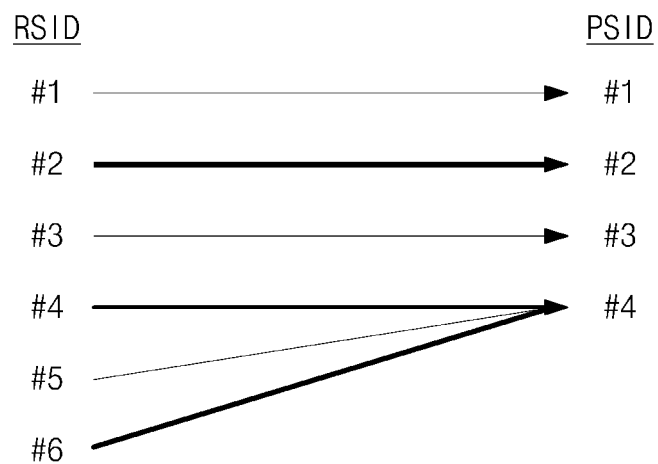
Figure 4:
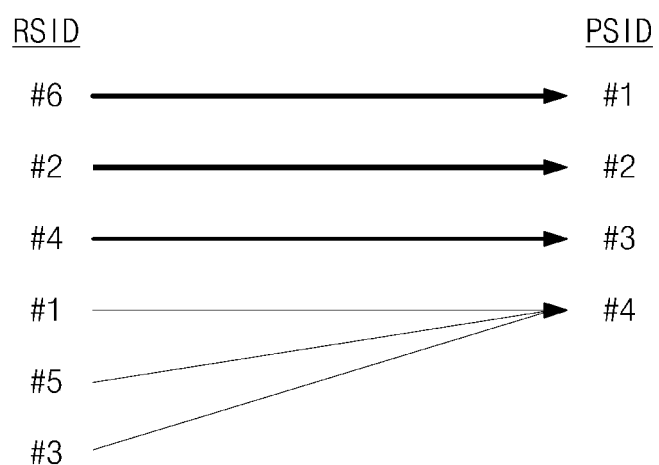

FIGS. 3 and 4 are conceptual diagrams illustrating a plurality of data streams transmitted in a storage system (e.g., 1000) of FIG. 1. Reference is now made to FIGS. 1, 3, and 4.

As described with reference to FIG. 2, in FIGS. 3 and 4, one data stream is expressed by one arrow. A direction of an arrow means a mapping relationship between a requested stream identifier RSID and a processing stream identifier PSID. A thickness of an arrow means a data amount of a data stream.

In some cases, the host 1100 may provide the storage device 1200 with more than the number of data streams that may be processed by the memory controller 1220 (i.e., R>P). For example, as illustrated in FIGS. 3 and 4, the memory controller 1220 may process a maximum of four data streams, while the host 1100 may provide the storage device 1200 with six data streams respectively having six requested stream identifiers RSID #1 to RSID #6.

In the above case, the memory controller 1220 may merge some of the six data streams respectively having the six requested stream identifiers RSID #1 to RSID #6. Data streams that are selected to be merged may be merged into one data stream having one processing stream identifier PSID.

For example, referring to FIG. 3, a first requested stream identifier RSID #1 to a third requested stream identifier RSID #3 may be mapped to a first processing stream identifier PSID #1 to a third processing stream identifier PSID #3, respectively. Write data of a data stream having the first requested stream identifier RSID #1 may be stored in at least one nonvolatile memory from among the nonvolatile memories 1210 according to the first processing stream identifier PSID #1. Write data of a data stream having the second requested stream identifier RSID #2 may be stored in at least one nonvolatile memory from among the nonvolatile memories 1210 according to the second processing stream identifier PSID #2. Write data of a data stream having the third requested stream identifier RSID #3 may be stored in at least one nonvolatile memory from among the nonvolatile memories 1210 according to the third processing stream identifier PSID #3.

Since three processing stream identifiers PSID #1 to PSID #3 are allocated, data streams having the fourth requested stream identifier RSID #4 to the sixth requested stream identifier RSID #6 may be merged into one data stream. Write data of the merged data stream may be stored in at least one nonvolatile memory from among the nonvolatile memories 1210 according to a fourth processing stream identifier PSID #4.

Meanwhile, referring to FIG. 3, a data stream having a small amount of data (e.g., a data stream having the first requested stream identifier RSID #1 or the third requested stream identifier RSID #3) may be stored according to a corresponding one of the processing stream identifiers (e.g., processing stream identifier PSID #1 to processing stream identifier PSID #3, respectively). Moreover, a data stream having a large amount of data (e.g., a data stream having the sixth requested stream identifier RSID #6) may be merged with other data streams.

In the case of the example of FIG. 3, load between data streams may be unbalanced, and the efficiency of a write operation may decrease. Moreover, a garbage collection operation may be relatively frequently performed on write data of data streams that are merged such that they have the common fourth processing stream identifier PSID #4. Because the merged data stream has a large amount of data, the number of garbage collection operations may increase. Thus, the life of the storage device 1200 may be reduced faster.

In the example embodiments of the present disclosure, data streams may be managed based on a data amount. The memory controller 1220 may manage mapping between the stream identifiers RSID and PSID. In addition, the memory controller 1220 may manage the merging of the data streams, based on a data amount of each of the data streams.

For example, referring to FIG. 4, write data of a data stream having the sixth requested stream identifier RSID #6 may be stored in at least one nonvolatile memory from among the nonvolatile memories 1210 according to the first processing stream identifier PSID #1. Write data of a data stream having the second requested stream identifier RSID #2 may be stored in at least one nonvolatile memory from among the nonvolatile memories 1210 according to the second processing stream identifier PSID #2. Write data of a data stream having the fourth requested stream identifier RSID #4 may be stored in at least one nonvolatile memory from among the nonvolatile memories 1210 according to the third processing stream identifier PSID #3. Accordingly, a data stream having a large amount of data may be stored according to a corresponding one of the processing stream identifiers (e.g., processing stream identifier PSID #1 to processing stream identifier PSID #3, respectively).

Furthermore, data streams having the first requested stream identifier RSID #1, the third requested stream identifier RSID #3, and the fifth requested stream identifier RSID #5 may be merged into one data stream. Write data of the merged data stream may be stored in at least one nonvolatile memory from among the nonvolatile memories 1210 according to the fourth processing stream identifier PSID #4. Accordingly, data streams having a small amount of data may be merged together.

In the example of FIG. 4, load between data streams may be relatively balanced, and the efficiency of a write operation may be enhanced. Furthermore, since the merged data stream has a small amount of data, the number of garbage collection operations may be relatively reduced. Thus, the life of the storage device 1200 may be slowly shortened. In other words, the overall life of the storage device 1200 may be lengthened since the aging of the storage device 1200 may be slowed down.

Figure 5:
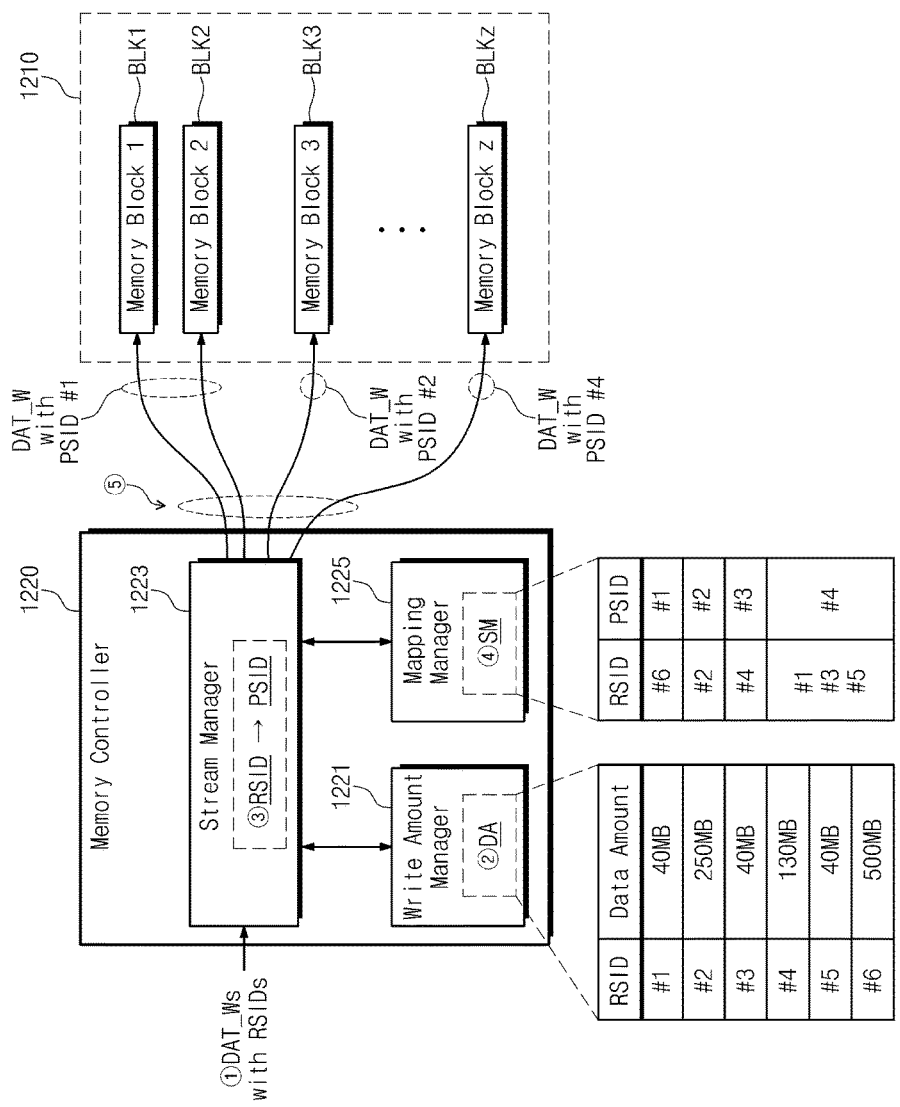
FIG. 5 is a conceptual diagram illustrating configurations and operations of a storage device of FIG. 1.

FIG. 5 is a conceptual diagram illustrating configurations and operations of a storage device (e.g., 1000) of FIG. 1. The storage device 1200 of FIG. 1 may include one or more nonvolatile memories 1210 and a memory controller 1220. In some example embodiments, the memory controller 1220 may include a write amount manager 1221, a stream manager 1223, and a mapping manager 1225.

The write amount manager 1221 may manage data amount information DA. The data amount information DA may include information associated with a data amount of each data stream from among a plurality of data streams having requested stream identifiers RSIDs. For example, the data amount information DA may include information associated with a relation between a requested stream identifier RSID and a data amount of a data stream having the requested stream identifier RSID.

The stream manager 1223 may map R requested stream identifiers RSIDs to P processing stream identifiers PSIDs, where each of the R and the P may be an integer greater than 1. In some example embodiments, the stream manager 1223 may map the stream identifiers RSID and PSID with reference to the data amount information DA. The stream manager 1223 may provide the nonvolatile memories 1210 with the data streams that are provided from the host 1100 of FIG. 1, according to the processing stream identifiers PSIDs.

The mapping manager 1225 may manage stream mapping information SM. The stream mapping information SM may include information associated with mapping between the requested stream identifiers RSIDs and the processing stream identifiers PSIDs. The stream manager 1223 may map the requested stream identifiers RSIDs to the processing stream identifiers PSIDs with reference to the stream mapping information SM.

The data amount information DA and the stream mapping information SM may be stored in at least one of a buffer memory included in the storage device 1200, a cache memory included in the memory controller 1220, or the nonvolatile memories 1210. The memory controller 1220 may manage the data amount information DA and/or the stream mapping information SM based on the data amount of each of the data streams. Furthermore, the memory controller 1220 may manage the data streams with reference to the data amount information DA and the stream mapping information SM.

For example, the memory controller 1220 may receive write data DAT_W from the host 1100 (e.g., operation ①). The write data DAT_W may be provided in the form of a plurality of data streams, each data stream being associated with a corresponding R requested stream identifier RSID from among the requested stream identifiers RSIDs (e.g., six RSIDs).

The write amount manager 1221 may obtain the data amount information DA associated with the data amount of each of the data streams (e.g., operation ②). For example, the write amount manager 1221 may directly measure the data amount of each data stream to obtain the data amount information DA. Alternatively, the write amount manager 1221 may indirectly obtain the data amount information DA by referring to header information of the write data DAT_W.

The stream manager 1223 may map the requested stream identifiers RSIDs to the processing stream identifiers PSIDs with reference to the data amount information DA (e.g., operation ③). The stream manager 1223 may locally store the mapping relationship information. When the mapping relationship is generated once, the mapping manager 1225 may obtain, from the stream manager 1223, the stream mapping information SM associated with the mapping between the requested stream identifiers RSIDs and the processing stream identifiers PSIDs (e.g., operation ④).

The stream manager 1223 may provide the data streams to the nonvolatile memories 1210 with reference to the stream mapping information SM (e.g., operation ⑤). The nonvolatile memories 1210 may include a plurality of memory blocks BLK1 to BLKz. For example, write data DAT_W of a data stream having a first processing stream identifier PSID #1 may be stored in a first memory block BLK1 and a second memory block BLK2. Write data DAT_W of a data stream having a second processing stream identifier PSID #2 may be stored in a third memory block BLK3. Write data DAT_W of a data stream having a fourth processing stream identifier PSID #4 may be stored in a $z^{th}$ memory block BLKz. Accordingly, the memory controller 1220 may manage information associated with a correspondence between a processing stream identifier PSID and a memory block.

However, flow of data streams illustrated in FIG. 5 is an illustrative example to assist in the understanding of this disclosure, and is not intended to limit the present disclosure to only this example embodiment. Transmitting the data streams, mapping between stream identifiers RSID and PSID, allocating memory blocks, and storing the write data may be changed or modified in various ways without departing from the inventive concepts disclosed herein.

Figure 6:
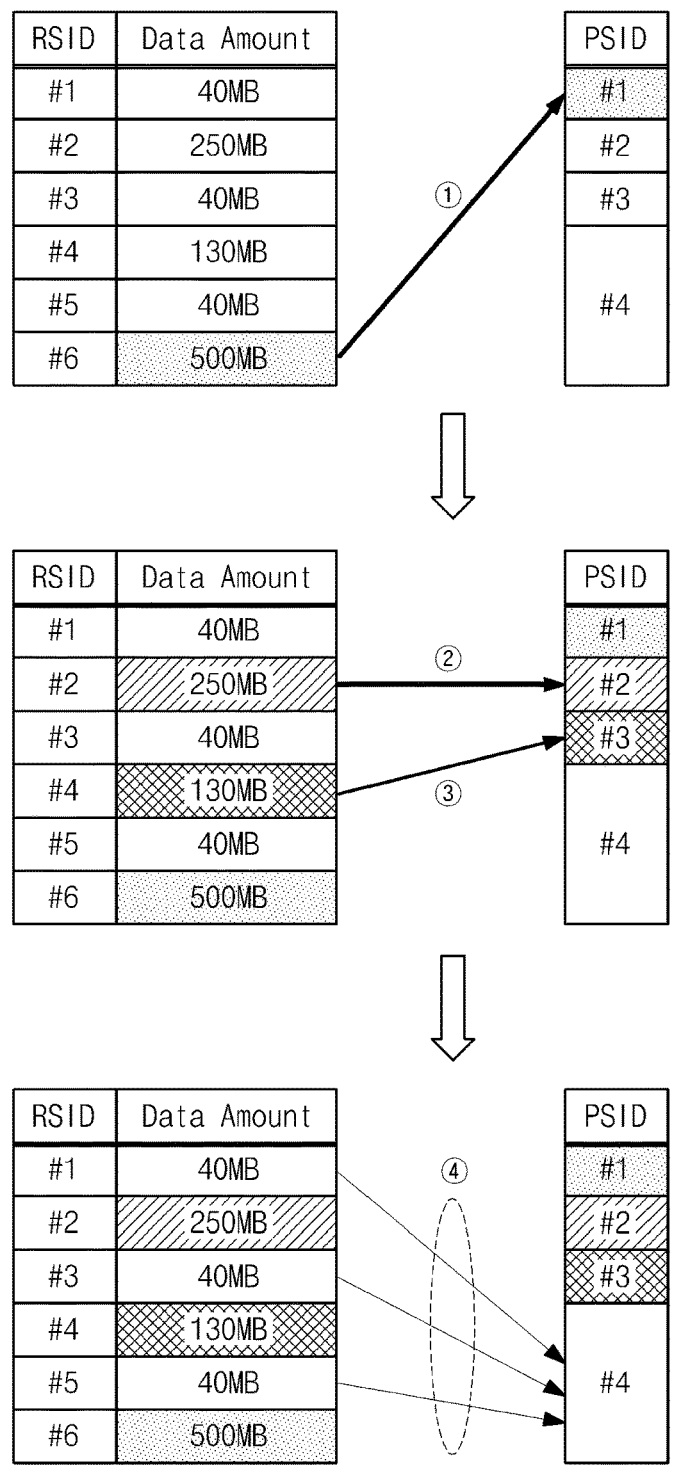
FIG. 6 is a conceptual diagram illustrating an example mapping between stream identifiers according to an example embodiment.

FIG. 6 is a conceptual diagram illustrating an example mapping between stream identifiers according to an example embodiment. Reference is now made to FIGS. 1 and 6.

As described above, in some cases, the host 1100 may provide the storage device 1200 with R (e.g., six) data streams, which is more than P (e.g., four) data streams that may be processed by the memory controller 1220. In this case, the memory controller 1220 may merge some of data streams from among the data streams having processing stream identifiers RSID #1 to RSID #6, based on the data amount of each of the data streams.

In some example embodiments, the memory controller 1220 may map a requested stream identifier of a data stream having the largest amount of data (e.g., the sixth requested stream identifier RSID #6, having a data amount of 500 MB) to the first processing stream identifier PSID #1 (e.g., operation ①). Accordingly, the data stream having the sixth requested stream identifier RSID #6 may be provided to nonvolatile memories 1210 according to the first processing stream identifier PSID #1.

Furthermore, the memory controller 1220 may map a requested stream identifier of a data stream having the second largest amount of data (e.g., the second requested stream identifier RSID #2, having a data amount of 250 MB) and a requested stream identifier of a data stream having the third largest amount of data (i.e., the fourth requested stream identifier RSID #4, having a data amount of 130 MB) to a second processing stream identifier PSID #2 and a third processing stream identifier PSID #3, respectively (e.g., operations ② and ③). Accordingly, the data stream having the second requested stream identifier RSID #2 may be provided to the nonvolatile memories 1210 according to the second processing stream identifier PSID #2. In addition, the data stream having the fourth requested stream identifier RSID #4 may be provided to the nonvolatile memories 1210 according to the third processing stream identifier PSID #3.

The memory controller 1220 may map the first requested stream identifier RSID #1, the third requested stream identifier RSID #3, and the fifth requested stream identifier RSID #5 to a fourth processing stream identifier PSID #4 (e.g., operation ④). Remaining data streams having the first requested stream identifier RSID #1, the third requested stream identifier RSID #3, and the fifth requested stream identifier RSID #5 may be merged into one data stream having the fourth processing stream identifier PSID #4. Accordingly, the remaining data streams having the first requested stream identifier RSID #1, the third requested stream identifier RSID #3, and the fifth requested stream identifier RSID #5 may be provided to the nonvolatile memories 1210 according to the fourth processing stream identifier PSID #4.

That is, in the above example embodiment, (P−1) data streams, that are selected according to an order based on the data amount from among the data streams having the requested stream identifiers RSIDs, may be allocated to have (P−1) processing stream identifiers PSIDs, respectively. Furthermore, remaining (R−P+1) data streams except for the selected (P−1) data streams may be merged to have a remaining one processing stream identifier PSID. Each of the data streams that are merged into one data stream may have a data amount smaller than each of data streams that are not merged into the one data stream. According to the example embodiments, mapping between the stream identifiers RSID and PSID and merging the data streams may be managed based on the data amount of each of the data streams.

However, mapping between the stream identifiers RSID and PSID described with reference to FIG. 6 is an example that is provided to assist in the understanding of the present disclosure. Mapping between the stream identifiers RSID and PSID may be changed or modified in various ways to balance load between the data streams and to reduce the number of garbage collection operations. For example, each of the first processing stream identifier PSID #1 and the second processing stream identifier PSID #2 may be mapped with a requested stream identifier RSID of one data stream having the larger amount of data, and a data stream allocated to each of the third processing stream identifier PSID #3 and the fourth processing stream identifier PSID #4 may be obtained by merging multiple data streams having the smaller amount of data. FIG. 6 is not intended to limit the present disclosure to only this example embodiment.

Figure 7:
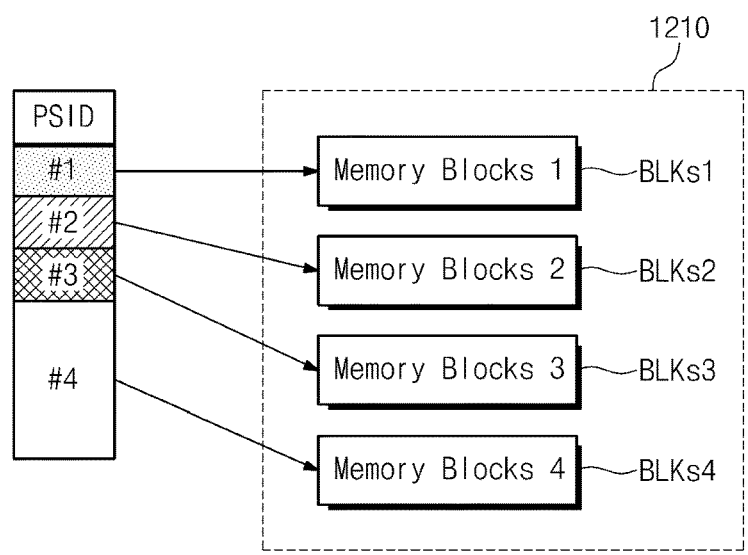
FIG. 7 is a conceptual diagram illustrating storing write data of a plurality of data streams according to an example embodiment.

FIG. 7 is a conceptual diagram illustrating storing write data of a plurality of data streams according to an example embodiment. Reference is now made to FIGS. 1 and 7.

One or more nonvolatile memories 1210 may include a plurality of memory blocks. For example, the nonvolatile memories 1210 may include first memory blocks BLKs1 to fourth memory blocks BLKs4.

In some example embodiments, write data of a data stream having one processing stream identifier PSID may be stored together in the same memory region (e.g., the same memory block). On the other hand, write data of multiple data streams having different processing stream identifiers PSIDs may be separately stored in different memory regions (e.g., different memory blocks). Each of the memory blocks included in the nonvolatile memories 1210 may store write data of a data stream corresponding to one of the processing stream identifiers PSIDs.

For example, write data of a data stream having the first processing stream identifier PSID #1 may be stored in first memory blocks BLKs1 separately from write data of other data streams. While write data of a data stream having the second processing stream identifier PSID #2 may be stored in second memory blocks BLKs2, write data of a data stream having the third processing stream identifier PSID #3 may be stored in third memory blocks BLKs3. Write data of the one data stream (i.e., the merged stream data) having the fourth processing stream identifier PSID #4 may be stored together in fourth memory blocks BLKs4.

According to the example embodiment, data having the identical or similar characteristic may be managed together. Thus, the efficiency of allocating a new memory block may be improved, and the performance of a write operation may be enhanced. Furthermore, load between data streams may become balanced and the number of garbage collection operations may be reduced, by managing a processing stream identifier PSID based on a data amount of each data stream. As a result, the life of the storage device 1200 may be slowly shortened. In other words, the overall life of the storage device 1200 may be lengthened since the aging of the storage device 1200 may be slowed down.

Figure 8:
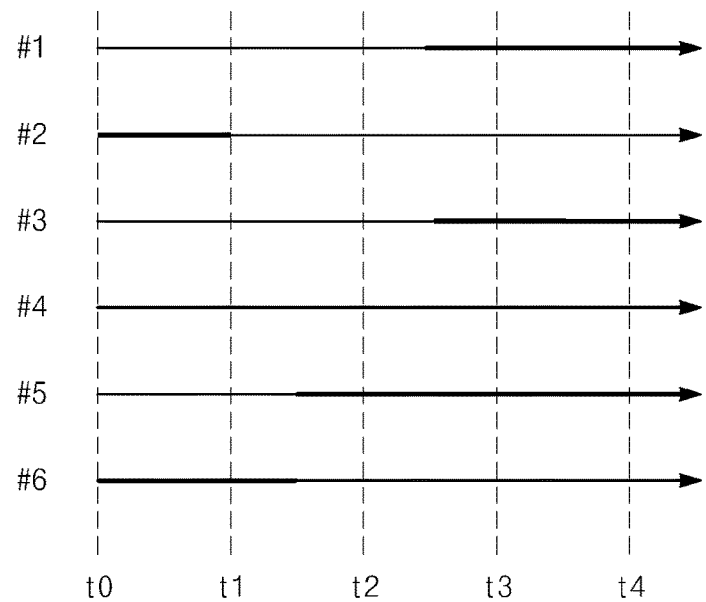
FIG. 8 is a conceptual diagram illustrating a case where data amounts of a plurality of data streams transmitted in a storage system of FIG. 1 vary according to time characteristic.
Figure 9:
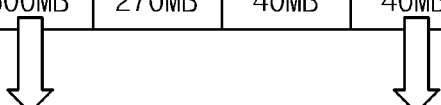
FIGS. 9 to 11 are conceptual diagrams illustrating information associated with a data amount of each of a plurality of data streams of FIG. 8, and example mappings between stream identifiers.
Figure 9:
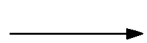

FIG. 8 is a conceptual diagram illustrating a case where data amounts of a plurality of data streams transmitted in a storage system of FIG. 1 vary with elapsing of time. FIG. 9 is a conceptual diagram illustrating information associated with a data amount of each of a plurality of data streams of FIG. 8, and an example mapping between stream identifiers. Reference is now made to FIGS. 1, 5, 8, and 9.

In FIG.8, the x-axis of the diagram represents time, and one data stream is represented by one arrow. As can be seen in FIG. 8, a thickness of each of the arrows is not uniform over time. This means that the data amount of the data stream varies according to a time characteristic, the variance of which may be different for each data stream.

In some cases, a data amount of a specific data stream may not be constant and may vary. For example, referring to FIG. 8, a data amount of a data stream having the first requested stream identifier RSID #1 increases at a point in time between t2 and t3. By way of another example, a data amount of a data stream having the sixth requested stream identifier RSID #6 decreases at a point in time between t1 and t2.

The memory controller 1220 may manage the variation on the data amount of each of the data streams. The memory controller 1220 may select data streams that are to be merged into one data stream and data streams that are to be transmitted without merging, based on the variation on a data amount of each data stream. In some example embodiments, when the data amount of each of the data streams varies, the data streams that are to be merged into one data stream and/or data streams that are to be transmitted without merging may be changed.

Accordingly, the memory controller 1220 may monitor whether the data amount of each of the data streams having the requested stream identifiers RSIDs varies or not. For example, a write amount manager 1221 of the memory controller 1220 may manage data amount information DA during one or more measurement intervals, as illustrated in FIG. 9. To manage a data amount for each of the measurement intervals, the write amount manager 1221 may update the data amount information DA when an update condition is satisfied.

In some example embodiments, the update condition may be satisfied when a reference time elapses. That is, the write amount manager 1221 may update the data amount information DA in response to lapse of the reference time. The variation on the data amount may be recognized based on the updated data amount information DA.

For example, referring to FIGS. 8 and 9 together, at the time t1, after the reference time has elapsed from the time t0 to the time t1, the write amount manager 1221 may obtain information associated with a data amount of each of the data streams for a measurement interval between the time t0 and the time t1. The stream manager 1223 may map the stream identifiers RSID and PSID to each other, with reference to the information obtained by the write amount manager 1221. The mapping manager 1225 may manage the stream mapping information SM associated with the mapping between the stream identifiers RSIDs and PSIDs. Accordingly, after the time t1, the data streams may be transmitted and stored according to the mapped processing requested identifiers PSIDs.

However, after the time t1, a data amount of each of the data streams may vary. When a data amount of each of the data streams varies, it may be effective to change mapping between the stream identifiers RSID and PSID based on the varying data amount.

Accordingly, at the time t2, after the reference time has elapsed from the time t1 to the time t2, the write amount manager 1221 may obtain information associated with a data amount of each of the data streams for a measurement interval between the time t1 and the time t2. The stream manager 1223 may change the mapping between the stream identifiers RSIDs and PSIDs with reference to the information obtained by the write amount manager 1221. For example, the stream manager 1223 may newly map the stream identifiers RSIDs and PSIDs by means of a method described above with reference to FIG. 6. The mapping manager 1225 may update the stream mapping information SM to manage the changed mapping. Accordingly, after the time t2, the data streams may be transmitted and stored according to the newly mapped processing requested identifiers PSIDs.

In such a manner, at the time t3, after the reference time has elapsed from the time t2 to the time t3, information associated with a data amount of each of the data streams may be obtained for a measurement interval between the time t2 and the time t3. Furthermore, at the time t4, after the reference time has elapsed from the time t3 to the time t4, information associated with a data amount of each of the data streams may be obtained for a measurement interval between the time t3 and the time t4.

For example, according to a mapping method described with reference to FIG. 6, after the time t4, each of data streams having the first requested stream identifier RSID #1, the third requested stream identifier RSID #3, and the fifth requested stream identifier RSID #5 may be each be associated with a corresponding one processing stream identifier PSID. Meanwhile, data streams having the second requested stream identifier RSID #2, the fourth requested stream identifier RSID #4, and the sixth requested stream identifier RSID #6 may be merged into one data stream.

Comparing mapping after the time t1 to mapping after the time t4, it may be understood that a mapping relationship is changed based on the data amount of each data stream. For example, a data stream where the data amount increases is newly mapped to be transmitted based on one stream identifier PSID, and a data stream where the data amount decreases is newly mapped to be merged into one data stream with other data streams, and so forth.

The "reference time" as used herein may be selected to have an appropriate value to effectively manage the data streams based on variations of a data amount. The reference time may have a fixed value, or alternatively, a value that fluctuates over time.

For example, the write amount manager 1221 may update the data amount information DA when an update condition is satisfied (e.g., when the reference time elapses). The stream manager 1223 may change mapping between stream identifiers RSIDs and PSIDs with reference to the updated data amount information DA, and the mapping manager 1225 may manage the changed mapping. The memory controller 1220 may differently select data streams that are to be merged into one data stream, in response to the variation on a data amount of at least one of the data streams. Accordingly, the data streams may be efficiently managed in response to the variation on the data amount.

An example embodiment for managing the data streams based on a data amount of a specific measurement interval has been described with reference to FIG. 9. In another example embodiment, the data streams may be managed based on data amounts for two or more measurement intervals. According to such an example embodiment, the data streams may be managed considering macroscopic characteristics of the data streams, rather than focusing on a specific time or interval. Such an example embodiment is described below with reference to FIGS. 10 and 11.

Figure 10:
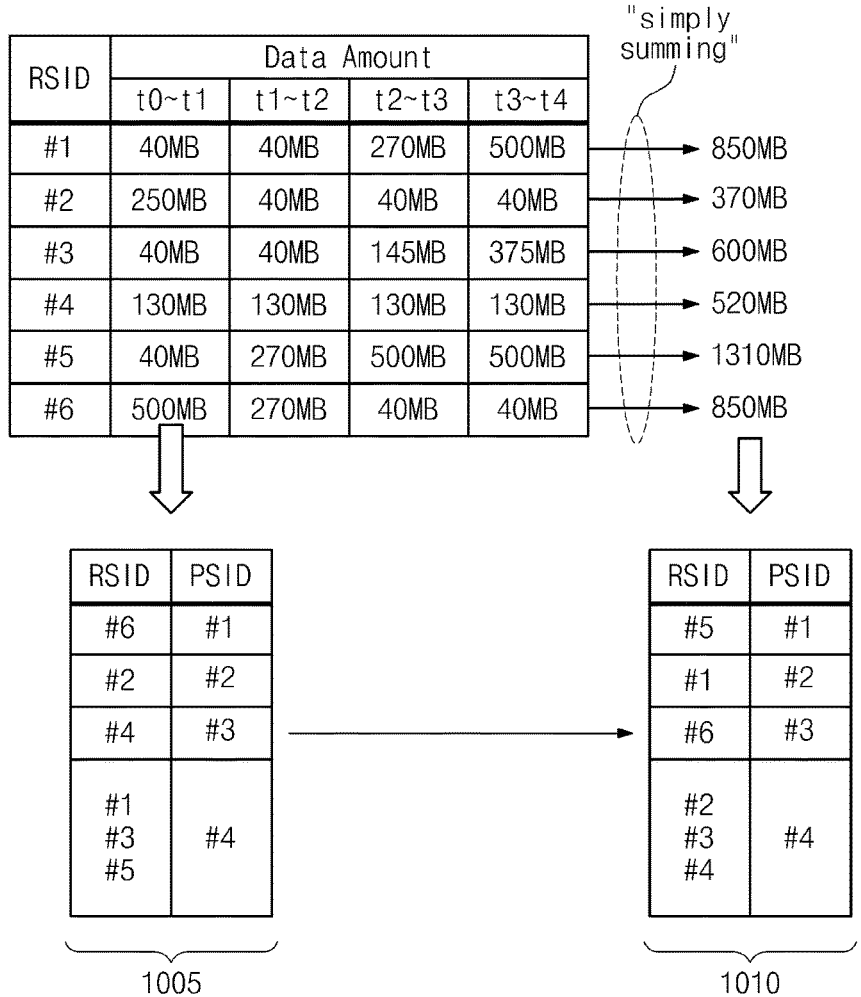

FIG. 10 is a conceptual diagram illustrating information associated with a data amount of each of a plurality of data streams of FIG. 8, and an example mapping between stream identifiers.

As described with reference to FIGS. 8 and 9, the variation on the data amount of each data stream may be associated with the mapping of stream identifiers RSIDs and PSIDs to each other, and with how the data streams are managed. When data amounts for two or more measurement intervals are referred together, rather than focusing on a specific measurement interval, the characteristics of the data streams may be considered.

As an example embodiment, referring to FIG. 10, to map the stream identifiers RSIDs and PSIDs after the time t4, data amounts of each of the data streams may be calculated by summing data sizes for measurement intervals between the time t0 and the time t4. When a mapping method described with reference to FIG. 6 is used based on the summed data amounts, after the time t4, each of data streams having the first requested stream identifier RSID #1, the fifth requested stream identifier RSID #5, and the sixth requested stream identifier RSID #6 may each be managed according to a corresponding one processing stream identifier PSID. Meanwhile, data streams having the second requested stream identifier RSID #2, the third requested stream identifier RSID #3, and the fourth requested stream identifier RSID #4 may be merged into one data stream.

According to the above example embodiment, a data stream that generally transmits large amounts of write data may each be managed according to a corresponding one processing stream identifier PSID. On the other hand, a data stream that generally transmits small amounts of write data may be merged into one stream together with other data streams.

As can be seen in FIG. 10, the mapping between the identifiers RSIDs and PSIDs can change over time. For example, the stream mapping information SM indicated at 1005 may be dependent on the data amount information DA associated with the time interval between the time t0 and the time t1. After the time t4, for example, the stream mapping information SM indicated at 1010 may be dependent on the data amount information DA associated with the time interval between the time t0 and the time t4. In other words, the data amount information DA may include data amounts that are summed across the time interval between the time t0 and the time t4 for each of the corresponding RSIDs. It will be understood that the data amounts can be summed across two or more time intervals (e.g., between the time interval t0 and the time interval t2, between the time interval t0 and the time interval t3, between the time interval t0 and the time interval t4, and so forth). The stream manager 1223 can sum the different data amounts across the time intervals for each data stream.

Figure 11:
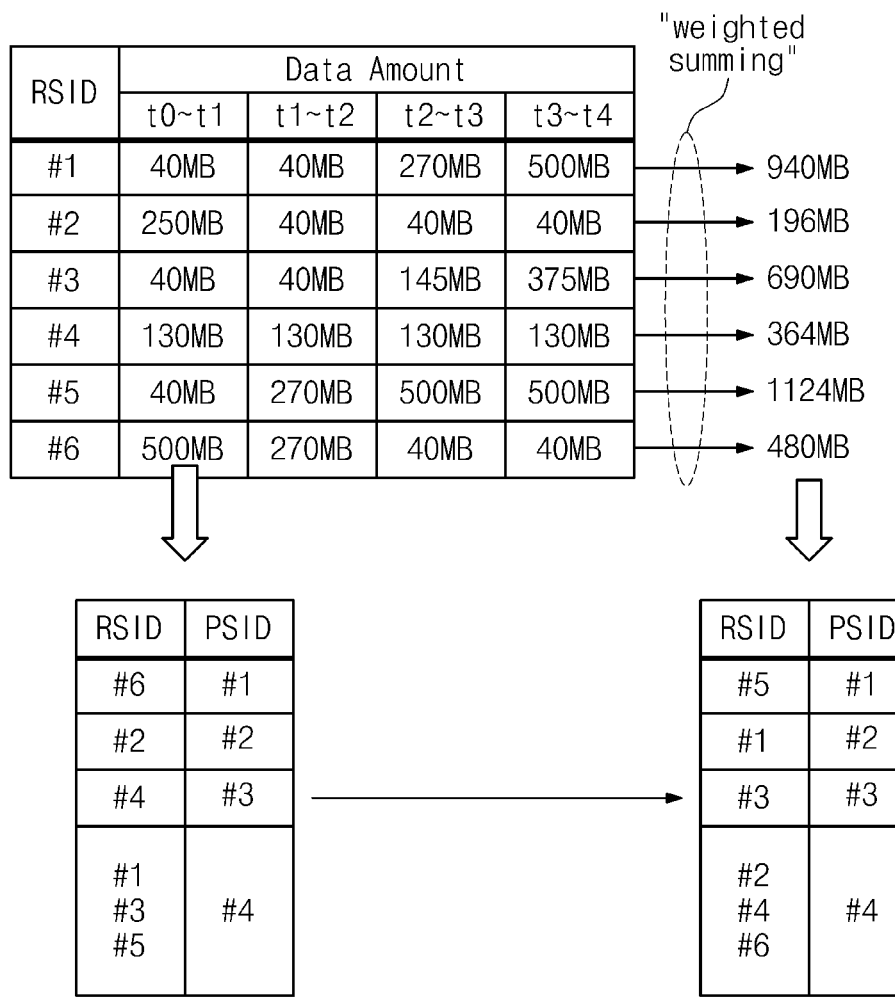

FIG. 11 is a conceptual diagram illustrating information associated with a data amount of each of a plurality of data streams of FIG. 8, and an example mapping between stream identifiers.

Referring to FIG. 11, to map stream identifiers RSIDs and PSIDs after the time t4, data amounts of each of the data streams may be calculated by weighted summing data sizes for measurement intervals between the time t0 and the time t4. For example, the weighted summed data amounts may be obtained by allocating a first weight to a data size of the most recent measurement interval (e.g., a measurement interval between the time t3 and the time t4) and allocating a second weight to each of data sizes of remaining measurement intervals (e.g., measurement intervals between the time t0 and the time t3) other than the most recent measurement interval.

In the case where the first weight value is denoted as "β" and the second weight value is denoted as "α," the following Equation 1 may be used for the weighted summing.

$$WD_i = D_{i,other} \times \alpha + D_{i,recent} \times \beta \quad \text{[Equation 1]}$$

In the above Equation 1, "$D_{i,\ recent}$" denotes a data amount in the most recent measurement interval of a data stream having an $i^{th}$ requested stream identifier, and "$D_{i,\ other}$" denotes a sum of data amounts in the remaining measurement intervals of the data stream having the $i^{th}$ requested stream identifier. Furthermore, "$WD_i$" denotes a weighted summed data amount for the data stream having the $i^{th}$ requested stream identifier.

For example, in the above Equation 1, when the first weight "β" is greater than the second weight "α," a data amount in the most recent measurement interval may be more considered (i.e., weighted more heavily) than a data amount in the remaining measurement intervals. FIG. 11 shows an example where the first weight of 1.6 is allocated to a data amount of a measurement interval between the time t3 and the time t4, and the second weight of 0.4 is allocated to a sum of data amounts of the measurement intervals between the time t0 and the time t3.

When a mapping method described with reference to FIG. 6 is used based on the weighted summed data amounts, after the time t4, each of data streams having the first requested stream identifier RSID #1, the third requested stream identifier RSID #3, and the fifth requested stream identifier RSID #5 may each be managed according to a corresponding one processing stream identifier PSID. Meanwhile, data streams having the second requested stream identifier RSID #2, the fourth requested stream identifier RSID #4, and the sixth requested stream identifier RSID #6 may be merged into one data stream.

According to the above example embodiment, a data stream that transmits write data having a large amount of data in the most recent measurement interval may be managed according to a corresponding one processing stream identifier PSID. On the other hand, a data stream that transmits write data having a small amount of data in the most recent measurement interval may be merged together with other data streams. According to this example embodiment, the increasing or decreasing of the data amount may be considered, or in other words, may be affect how and which data streams are merged.

As described with reference to FIGS. 8 to 11, the variation on a data amount may affect the management of the data streams in various ways. The storage device 1200 of FIG. 1 may employ only one of the manners described with reference to FIGS. 8 to 11. Alternatively, the storage device 1200 may variably employ two or more manners described with reference to FIGS. 8 to 11, according to at least one of various conditions such as an operating environment, performance of the storage device 1200, a request of the host of FIG. 1, or the like.

Figure 12:
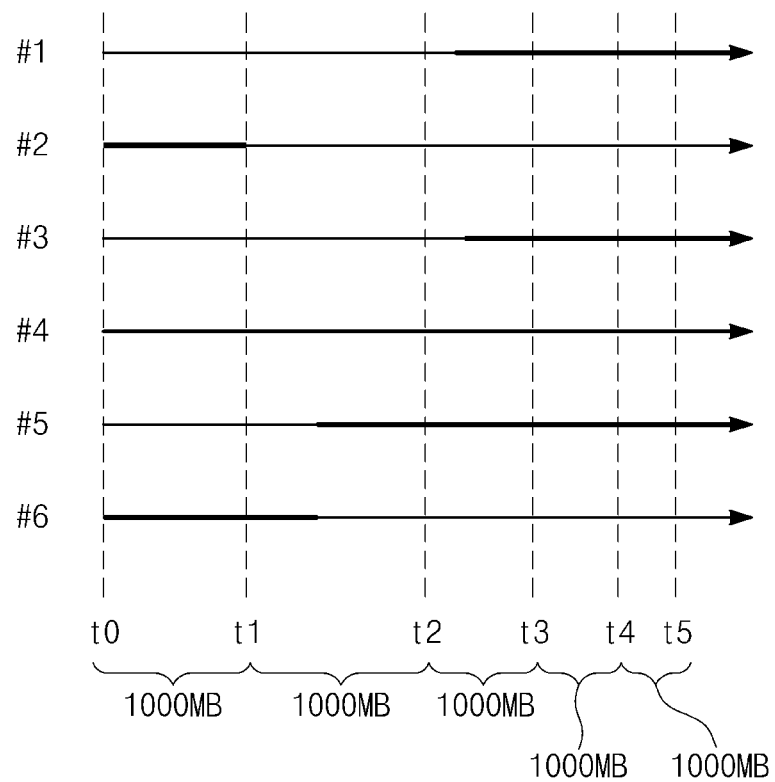
FIG. 12 is a conceptual diagram for describing an update condition to update information associated with a data amount of each of a plurality of data streams of FIG. 8.

FIG. 12 is a conceptual diagram for describing an update condition to update information associated with a data amount of each of a plurality of data streams of FIG. 8. Reference is now made to FIGS. 1, 5, and 12.

As described above, the write amount manager 1221 may update data amount information DA when an update condition is satisfied, to manage a data amount for each of various measurement intervals. Accordingly, the variation on the data amount may be managed. In the example embodiments described with reference to FIGS. 8 to 11, the update condition may be satisfied when the reference time elapses.

However, the above example embodiments are not intended to limit the present disclosure to only these embodiments. The update condition may be changed or modified in various ways. In some example embodiments, the update condition may be satisfied when the data streams having the requested stream identifiers RSIDs are provided from the host 1100 to the storage device 1200 as much as a reference data amount.

Referring to FIG. 12, the memory controller 1220 may monitor data amounts of all the data streams from the time t0. Afterwards, at the time t1, the data amounts of all the data streams may reach to a reference data amount (e.g., 1000 MB). The update condition may be satisfied when the data streams are provided as much as the reference data amount, and the write amount manager 1221 may obtain information associated with a data amount of each of the data streams for a measurement interval between the time t0 and the time t1, in response to the update condition being satisfied.

Similarly, the write amount manager 1221 may obtain information associated with a data amount of each of the data streams for a measurement interval between the time t1 and the time t2 where the data streams are provided as much as the reference data amount (e.g., 1000 MB). A measurement interval between the time t2 and the time t3, a measurement interval between the time t3 and the time t4, and a measurement interval between the time t4 and the time t5 may also be provided as the data streams are provided as much as (i.e., equivalent to) the reference data amount. Furthermore, the write amount manager 1221 may obtain information associated with the data amount of each of the data streams for each of the measurement intervals.

When the information associated with the data amount of each of the data streams are obtained for each of the measurement intervals, the stream identifiers RSIDs and PSIDs may be mapped to each other in a manner similar to that described with reference to FIGS. 8 to 11. For example, mapping between the stream identifiers RSIDs and PSIDs may be managed and changed based on the data amount for each measurement interval or the sum of the data amounts for two or more measurement intervals.

According to the above example embodiment, a length of each measurement interval may be changed depending on a transmission speed of one or more data streams. For example, when the transmission speed of the data streams is fast, the length of the measurement interval may become shorter. On the other hand, when the transmission speed of the data streams is slow, the length of the measurement interval may become longer.

In the above example embodiment, the "reference data amount" is not limited to 1000 MB. The reference data amount may be selected to have an appropriate value to efficiently manage the data streams based on the variation on the data amount. The reference data amount may have a fixed value or a variable value. In some embodiments, the reference data amount may adjusted up or down over time depending on the transmission speed of the data streams.

Unlike those described with reference to FIGS. 8 to 12, the update condition may be changed or modified in various ways. In another example embodiment, the update condition may be satisfied when the write request is provided from the host 1100. According to this example embodiment, whenever a new write operation is performed, the information associated with the data amount and the variation on the data amount may be managed and updated. In still another example embodiment, the update condition may be satisfied when an event (e.g., allocating a new memory block or restoring an invalid memory block in nonvolatile memories 1210) occurs. According to this example embodiment, whenever a specific event occurs in the non-volatile memory 1210, the information associated with the data amount and the variation on the data amount may be managed and updated.

The storage device 1200 may employ only one of the update conditions described with reference to FIGS. 8 to 12. Alternatively, the storage device 1200 may variably employ the update conditions described with reference to FIGS. 8 to 12, according to at least one of various conditions such as an operating environment or performance of the storage device 1200, a request from a host, or the like. Example embodiments of the present disclosure may be changed or modified in various ways.

As described with reference to FIGS. 1 to 12, the storage device 1200 according to the example embodiments may receive write data in the form of a plurality of data streams. Furthermore, the storage device 1200 may manage the data streams based on the data amount. According to the example embodiment, the performance of a write operation may be enhanced, and the life of the storage device 1200 may be slowly shortened. In other words, the overall life of the storage device 1200 may be lengthened since the aging of the storage device 1200 may be slowed down. Furthermore, although the host 1100 provides the storage device 1200 with more than the number of data streams that may be processed by the memory controller 1220, the data streams may be efficiently managed based on the data amount.

Figure 13:
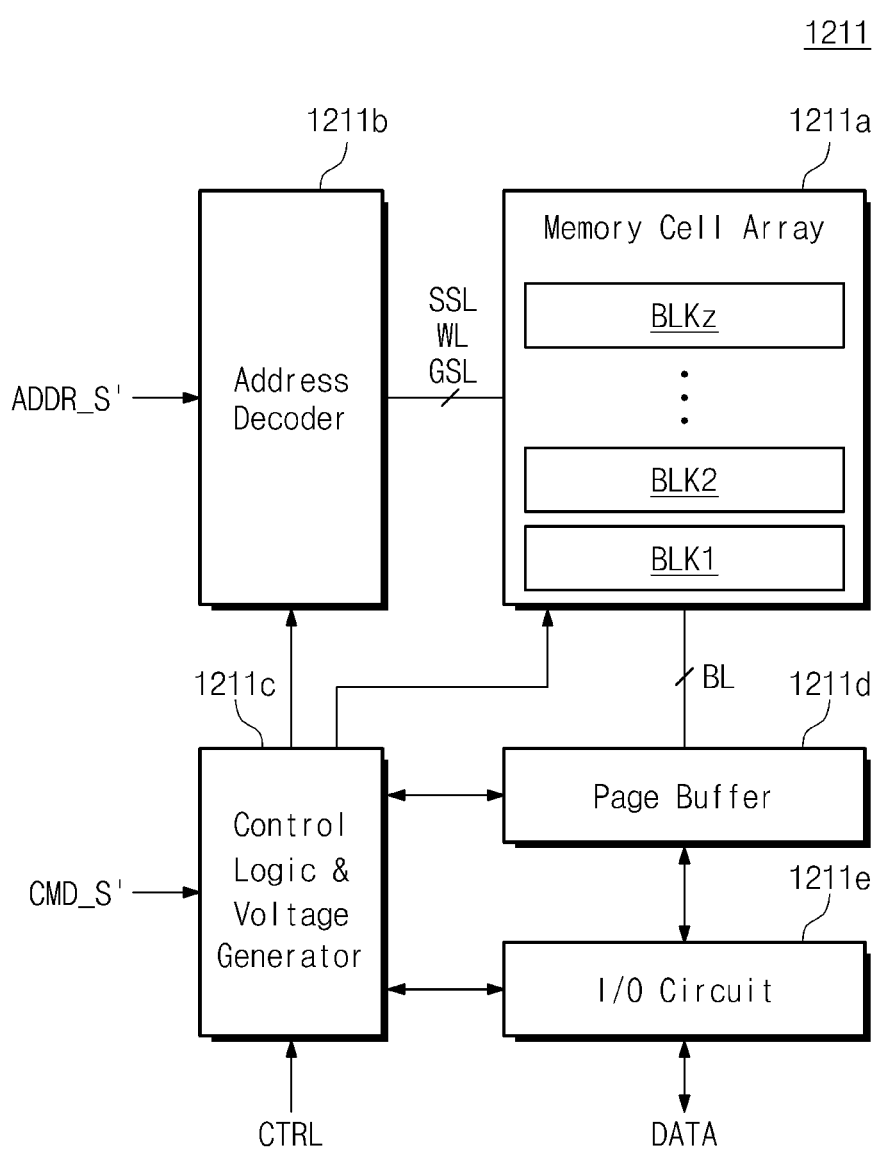
FIG. 13 is a block diagram illustrating one of the nonvolatile memories of FIG. 1.

FIG. 13 is a block diagram illustrating one of the non-volatile memories of FIG. 1. At least one of one or more nonvolatile memories 1210 of FIG. 1 may include a nonvolatile memory 1211. The nonvolatile memory 1211 may include a memory cell array 1211*a*, an address decoder 1211*b*, a control logic and voltage generator 1211*c*, a page buffer 1211*d*, and an input/output circuit 1211*e*.

The memory cell array 1211*a* may include a plurality of memory blocks BLK1 to BLKz. Each of the memory blocks BLK1 to BLKz may include a plurality of cell strings. Each of the cell strings may include a plurality of memory cells. Each of the memory cells may be connected to a plurality of word lines WL. Each of the memory cells may include a single level cell (SLC) storing one bit or a multi-level cell (MLC) storing at least two bits.

In some example embodiments, the memory cell array 1211*a* may include a three dimensional (3D) memory array. The 3D memory array may be monolithically formed in one or more physical levels of memory cell arrays having an active area that is disposed on a silicon substrate and circuitry associated with the operations of those memory cells. The circuitry associated with the operations of memory cells may be arranged in a substrate or on a substrate. The term "monolithic" means that layers of each level of the 3D memory array are directly deposited on layers of each underlying level of the 3D memory array.

In some example embodiments, the 3D memory array may include vertical NAND strings that are vertically oriented such that at least one memory cell is located over another memory cell. At least one memory cell may include a charge trap layer. Each of the vertical NAND strings may include at least one selection transistor located over memory cells. At least one selection transistor may have the same structure as memory cells, and may be monolithically formed together with memory cells.

The following patent documents, which are hereby incorporated by reference, describe suitable configurations for 3D memory arrays, in which the 3D memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Each of the memory blocks BLK1 to BLKz may be configured to be suitable for storing a plurality of data streams according to the example embodiments of the present disclosure. For example, each of the memory blocks BLK1 to BLKz may store write data of the data stream corresponding to one of processing stream identifiers PSIDs described with reference to FIGS. 1 to 12. Accordingly, the data having the same or similar characteristic may be managed together. Thus, it may be possible to enhance the efficiency of allocating a new memory block and to improve the performance of a write operation. In addition, the number of garbage collection operations to restore a page of invalid data and to secure a free page may be reduced, and thus the life of the storage device 1200 may be slowly shortened. In other words, the overall life of the storage device 1200 may be lengthened since the aging of the storage device 1200 may be slowed down.

The address decoder 1211*b* may be connected with the memory cell array 1211*a* through the word lines WL, string selection lines SSL, and ground selection lines GSL. The address decoder 1211*b* may receive an address ADDR_S' from the memory controller 1220 of FIG. 1, and may decode the received address ADDR_S'. The address decoder 1211*b* may select at least one of the word lines WL based on the decoded address ADDR_S' and may drive the at least one selected word line.

The control logic and voltage generator 1211*c* may receive a command CMD_S' and a control signal CTRL from the memory controller 1220. The control logic and voltage generator 1211*c* may control the address decoder 1211*b*, the page buffer 1211*d*, and the input/output circuit 1211*e* in response to the received signals. For example, the control logic and voltage generator 1211*c* may control the address decoder 1211*b*, the page buffer 1211*d*, and the input/output circuit 1211*e* in response to the command CMD_S' and the control signal CTRL such that write data DATA provided from the memory controller 1220 is stored in the memory cell array 1211*a* or such that read data DATA stored in the memory cell array 1211*a* is read.

The control logic and voltage generator 1211*c* may generate various voltages used to operate the nonvolatile memory 1211. For example, the control logic and voltage generator 1211*c* may generate a plurality of program voltages, a plurality of pass voltages, a plurality of selection read voltages, a plurality of non-selection read voltages, a plurality of erase voltages, and a plurality of verification voltages. The control logic and voltage generator 1211*c* may provide the generated voltages to the address decoder 1211*b* or to a substrate of the memory cell array 1211*a*.

The page buffer 1211*d* may be connected with the memory cell array 1211*a* through a plurality of bit lines BL. Under the control of the control logic and voltage generator 1211*c*, the page buffer 1211*d* may control the bit lines BL such that write data DATA provided from the input/output circuit 1211*e* is stored in the memory cell array 1211*a*. Under the control of the control logic and voltage generator 1211*c*, the page buffer 1211*d* may read data stored in the memory cell array 1211*a* and may provide the read data to the input/output circuit 1211*e*. For example, the page buffer 1211*d* may receive data from the input/output circuit 1211*e* by page unit, or may read data from the memory cell array 1211a by page unit. In some example embodiments, the page buffer 1211d may include data latches for temporarily storing data read from the memory cell array 1211a or data provided from the input/output circuit 1211e.

The input/output circuit 1211e may receive write data DATA from an external device such as the memory controller 1220, and may provide the received write data DATA to the page buffer 1211d. Alternatively, the input/output circuit 1211e may receive read data DATA from the page buffer 1211d, and may provide the received read data DATA to an external device such as the memory controller 1220. For example, the input/output circuit 1211e may exchange data DATA with an external device in synchronization with the control signal CTRL.

Figure 14:
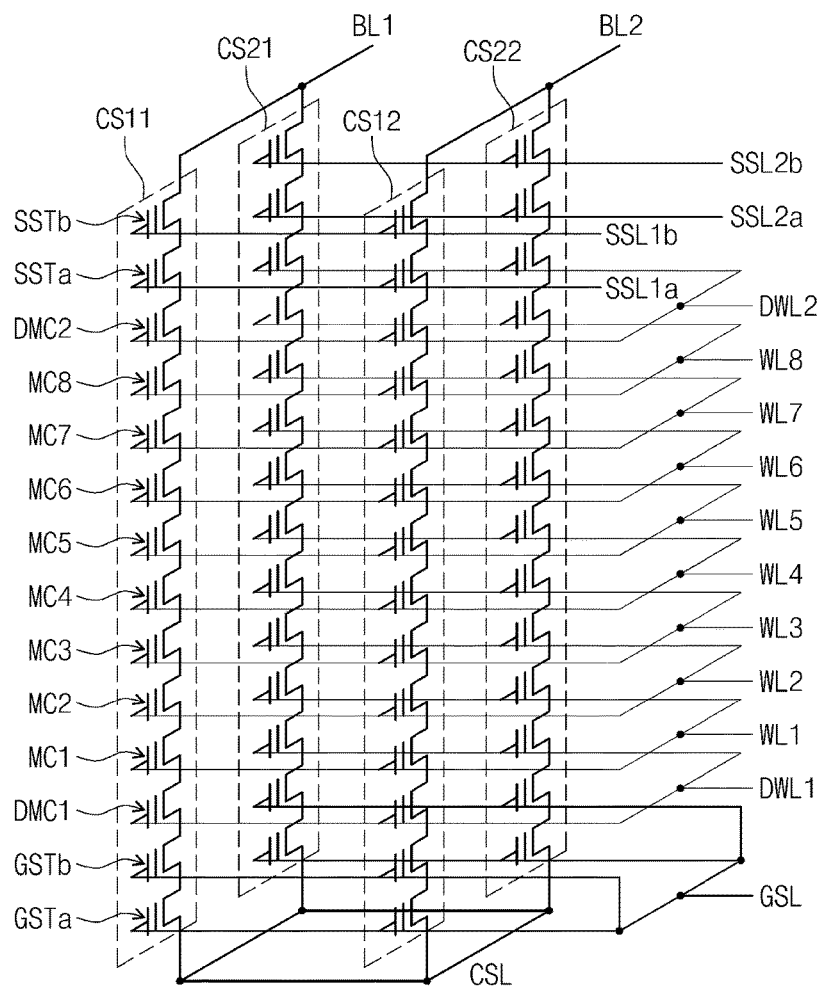
FIG. 14 is a conceptual diagram illustrating one memory block of a memory cell array of FIG. 13.

FIG. 14 is a conceptual diagram illustrating one memory block of a memory cell array of FIG. 13. A first memory block BLK1 of the 3D array structure will be described with reference to FIG. 14. For example, FIG. 14 illustrates a case where a memory cell array 1211a of FIG. 13 includes a NAND-type flash memory. However, the present disclosure is not limited to the configuration illustrated in FIG. 14. Other memory blocks may be configured to be similar to the first memory block BLK1.

The first memory block BLK1 may include a plurality of cell strings CS11 to CS12 and CS21 to CS22. The plurality of cell strings CS11 to CS12 and CS21 to CS22 may be arranged in a matrix of rows and columns along a row direction and a column direction. For example, the cell strings CS11 and CS12 may be connected with string selection lines SSL1a and SSL1b to form a first row. The cell strings CS21 and CS22 may be connected with string selection lines SSL2a and SSL2b to form a second row. Furthermore, the cell strings CS11 and CS21 may be connected with a first bit line BL1 to form a first column. The cell strings CS12 and CS22 may be connected with a second bit line BL2 to form a second column.

Each of the cell strings CS11 to CS12 and CS21 to CS22 may include a plurality of cell transistors. For example, each of the cell strings CS11 to CS12 and CS21 to CS22 may include string selection transistors SSTa and SSTb, a plurality of memory cells MC1 to MC8, ground selection transistors GSTa and GSTb, and dummy memory cells DMC1 and DMC2. For example, each of the plurality of cell transistors included in the cell strings CS11 to CS12 and CS21 to CS22 may be a charge trap flash memory cell.

Memory cells MC1 to MC8 may be serially connected, and may be stacked in a height direction that is perpendicular to a plane formed by the row and column directions. String selection transistors SSTa and SSTb may be serially connected, and may be provided between the memory cells MC1 to MC8 and bit line BL. Ground selection transistors GSTa and GSTb may be serially connected, and may be provided between the memory cells MC1 to MC8 and a common source line CSL.

For example, the first dummy memory cell DMC1 may be provided between the memory cells MC1 to MC8 and the ground selection transistors GSTa and GSTb. For example, the second dummy memory cell DMC2 may be provided between the memory cells MC1 to MC8 and the string selection transistors SSTa and SSTb.

The ground selection transistors GSTa and GSTb of the cell strings CS11 to CS12 and CS21 to CS22 may be connected to the ground selection line GSL in common. For example, ground selection transistors in the same row may be connected to the same ground selection line, and ground selection transistors of different rows may be connected to different ground selection lines. For example, first ground selection transistors GSTa of the cell strings CS11 and CS12 in the first row may be connected to the first ground selection line, and the first ground selection transistors GSTa of the cell strings CS21 and CS22 in the second row may be connected to the second ground selection line.

For example, although not illustrated in the drawings, the ground selection transistors placed at the same height from a substrate (not shown) may be connected to the same ground selection line, and the ground selection transistors placed at different heights may be connected to different ground selection lines. For example, the first ground selection transistors GSTa of the cell strings CS11 to CS12 and CS21 to CS2 may be connected to the first ground selection line, and the second ground selection transistors GSTb may be connected to the second ground selection line.

The memory cells placed at the same height from the substrate or the ground selection transistors GSTa and GSTb may be connected in common to the same word line, and the memory cells placed at different heights may be connected to different word lines. For example, the first to eighth memory cells MC1 to MC8 of the cell strings CS11 to CS12 and CS21 to CS2 may be respectively connected in common to the first to eighth word lines WL1 to WL8.

The string selection transistors in the same row among the first string selection transistors SSTa placed at the same height may be connected in the same string selection line, and the string selection transistors in different rows may be connected with different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a.

Similarly, the string selection transistors in the same row among the second string selection transistors SSTb placed at the same height may be connected to the same string selection line, and the string selection transistors in different rows may be connected with different string selection lines. For example, the second string selection transistors SSTb of the cell strings CS11 and CS12 in the first row may be connected in common to the string selection line SSL1b, and the second string selection transistors SSTb of the cell strings CS21 and CS22 in the second row may be connected in common to the string selection line SSL2b.

Although not illustrated in the drawings, the string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

For example, dummy memory cells placed at the same height may be connected with the same dummy word line, and dummy memory cells placed at different heights may be connected with different dummy word line. For example, the first dummy memory cells DMC1 may be connected with the first dummy word line DWL1, and the second dummy memory cells DMC2 may be connected with the second dummy word line DWL2.

In the first memory block BLK1, read and write operations may be performed by row unit. For example, one row of the first memory block BLK1 may be selected by the string selection lines SSL1a, SSL1b, SSL2a, and SSL2b.

For example, the cell strings CS11 and CS12 in the first row may be connected to the bit lines BL1 and BL2 when a turn-on voltage is supplied to the string selection lines SSL1a and SSL1b and a turn-off voltage is supplied to the string selection lines SSL2a and SSL2b. On the other hand, the cell strings CS21 and CS22 in the second row may be connected to the bit lines BL1 and BL2 when a turn-on voltage is supplied to the string selection lines SSL2a and SSL2b and a turn-off voltage is supplied to the string selection lines SSL1a and SSL1b. The memory cells placed at the same height may be selected from among the memory cells of the cell string in the row driven by driving the word line. The read and write operations may be performed on the selected memory cells. The selected memory cells may form a physical page.

In the first memory block BLK1, an erase operation may be performed by memory block unit or sub-block unit. When the erase operation is performed by memory block unit, all the memory cells MC1 to MC8 of the first memory blocks BLK1 may be concurrently erased in response to one erase request. When the erase operation is performed by sub-block unit, some of the memory cells MC1 to MC8 of the first memory blocks BLK1 may be erased in response to an erase request, and the remaining memory cells may be prevented from erasing. A low voltage (e.g., a ground voltage) may be supplied to a word line that is connected to memory cells to be erased, and a word line connected to erase-inhibited memory cells may be floated.

The configurations of the first memory blocks BLK1 illustrated in FIG. 14 are just an example. The number of the cell strings may increase or decrease, and the number of rows and columns that are constituted by cell strings may increase or decrease according to the number of the cell strings. Furthermore, the number of cell transistors (e.g., GST, MC, DMC, SST, and/or the like) may increase or decrease, and the height of the first memory block BLK1 may increase or decrease according to the number of the cell transistors. In addition, the number of lines (e.g., GSL, WL, DWL, SSL, and/or the like) may increase or decrease according to the number of the cell transistors.

Figure 15:
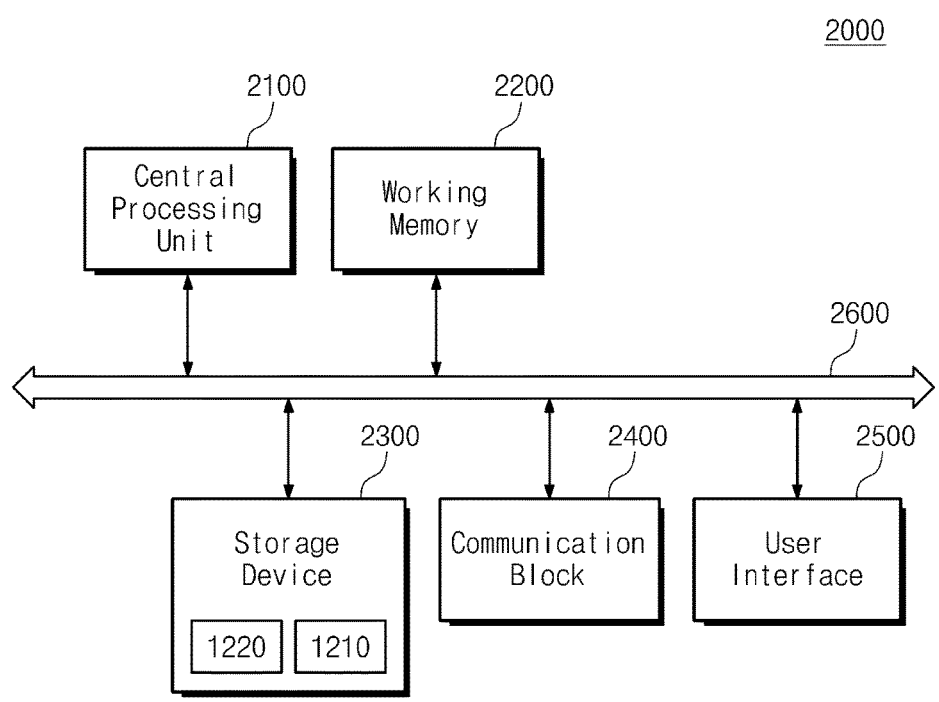
FIG. 15 is a block diagram illustrating a computing device including a storage device according to an example embodiment.

FIG. 15 is a block diagram illustrating a computing device including a storage device according to an example embodiment. A computing device 2000 may include a central processing unit 2100, a working memory 2200, a storage device 2300, a communication block 2400, a user interface 2500, and a bus 2600. For example, the computing device 2000 may be one of various electronic devices, such as a personal computer, a workstation, a notebook computer, a tablet, and the like.

The central processing unit 2100 may control the overall operations of the computing device 2000. The central processing unit 2100 may perform various kinds of arithmetic operations and/or logical operations. For example, the central processing unit 2100 may include a general-purposed processor, a special-purposed processor, and/or an application processor.

The working memory 2200 may exchange data with the central processing unit 2100. The working memory 2200 may temporarily store data used in an operation of the computing device 2000. The working memory 2200 may be used as a buffer or a cache of the computing device 2000. For example, the working memory 2200 may include one or more of various volatile memories, such as a static RAM (SRAM), a dynamic RAM (DRAM), a synchronous DRAM (SDRAM), and the like. The working memory 2200 may include one or more memory modules or one or more memory packages.

The storage device 2300 may store data that needs to be stored regardless of power supply. For example, the storage device 2300 may include at least one of nonvolatile memories, such as a flash memory, PRAM, MRAM, ReRAM, FRAM, and/or the like. For example, the storage device 2300 may include a storage medium such as a solid state drive (SSD).

The storage device 2300 may be implemented based on at least one of the example embodiments described with reference to FIGS. 1 to 12. The storage device 2300 may include one or more nonvolatile memories 1210 and a memory controller 1220. For example, the storage device 2300 may receive write data in the form of a plurality of data streams. Furthermore, the storage device 2300 may manage the data streams based on a data amount. According to the example embodiments, the performance of a write operation may be enhanced, and the life of the storage device 2300 may be slowly shortened. In other words, the overall life of the storage device 1200 may be lengthened since the aging of the storage device 1200 may be slowed down.

The communication block 2400 may communicate with an external device outside the computing device 2000 under the control of the central processing unit 2100. The communication block 2400 may communicate with an external device outside the computing device 2000 in compliance with a wired communication protocol and/or a wireless communication protocol. For example, the communication block 2200 may communicate with an external device outside the computing device 3000 in compliance with at least one of various wireless communication protocols, such as long term evolution (LTE), worldwide interoperability for microwave access (WiMax), global system for mobile communication (GSM), code division multiple access (CDMA), Bluetooth, near field communication (NFC), wireless fidelity (WiFi), radio frequency identification (RFID), or the like, and/or at least one or various wired communication protocols, such as transfer control protocol/internet protocol (TCP/IP), universal serial bus (USB), small computer system interface (SCSI), advanced technology attachment (ATA), parallel ATA (PATA), serial ATA (SATA), SAS, integrated drive electronics (IDE), Firewire, or the like.

The user interface 2500 may arbitrate communications between a user and the computing device 2000 under the control of the central processing unit 2100. For example, the user interface 2500 may include an input interface, such as a keyboard, a mouse, a keypad, a button, a touch panel, a touch screen, a touch pad, a touch ball, a camera, a microphone, a gyroscope sensor, a vibration sensor, and/or the like. Furthermore, the user interface 2500 may include an output interface, such as a liquid crystal display (LCD) device, a light emitting diode (LED) display device, an organic LED (OLED) display device, an active matrix OLED (AMOLED) display device, a speaker, a motor, and/or the like.

The bus 2600 may provide a communication route between components of the computing device 2000. The components of the computing device 2000 may exchange data with each other based on a bus format of the bus 2600. For example, the bus format may include one or more of various protocols, such as USB, SCSI, PCIe, nonvolatile memory express (NVMe), ATA, PATA, SATA, SAS, IDE, universal flash storage (UFS), and/or the like.

Figure 16:
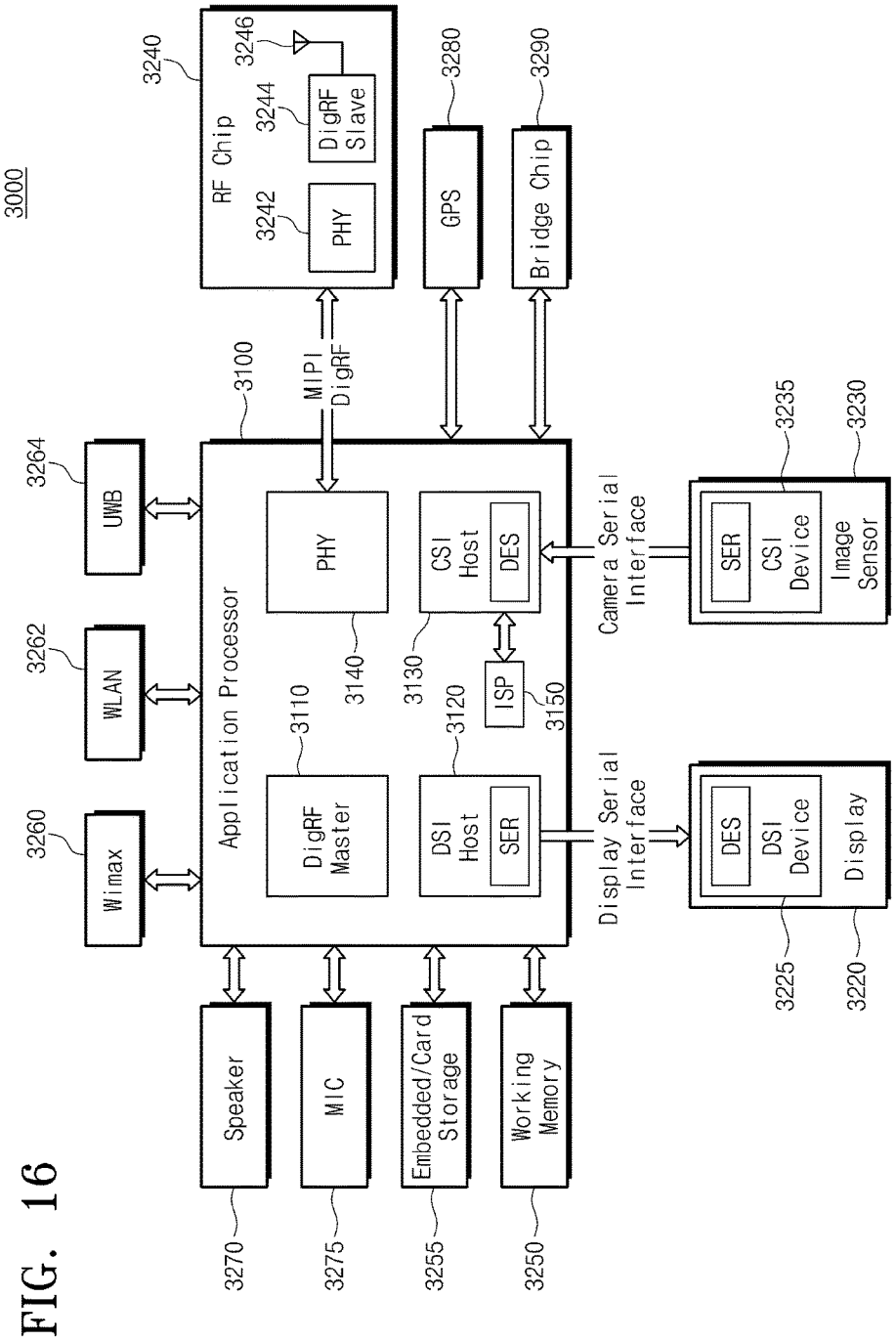
FIG. 16 is a block diagram illustrating an electronic system including a storage device according to an example embodiment and interfaces thereof.

FIG. 16 is a block diagram illustrating an electronic system including a storage device according to an example embodiment and interfaces thereof. An electronic system 3000 may be implemented with a data processing device capable of using or supporting an interface that is proposed by mobile industry processor interface (MIPI) alliance. For example, the electronic system 3000 may be one of various electronic devices, such as a portable communication terminal, a personal digital assistant (PDA), a portable multimedia player (PMP), a smart phone, or a wearable device, or the like.

The electronic system 3000 may include an application processor 3100, a display 3220, and an image sensor 3230. The application processor 3100 may include a DigRF master 3110, a display serial interface (DSI) host 3120, a camera serial interface (CSI) host 3130, a physical layer (PHY) 3140, and an image signal processor (ISP) 3150.

The DSI host 3120 may communicate with a DSI device 3225 of the display 3220 in compliance with DSI. For example, an optical serializer SER may be implemented in the DSI host 3120. For example, an optical deserializer DES may be implemented in the DSI device 3225.

The CSI host 3130 may communicate with a CSI device 3235 of the image sensor 3230 in compliance with CSI. For example, an optical deserializer DES may be implemented in the CSI host 3130. For example, an optical serializer SER may be implemented in the CSI device 3235. The image signal processor 3150 may communicate with the CSI host 3130 via a memory (e.g., a working memory 3250 or a memory embedded in the application processor 3100) and a bus.

The electronic system 3000 may further include a radio frequency (RF) chip 3240 for communicating with the application processor 3100. The RF chip 3240 may include a physical layer (PHY) 3242, a DigRF slave 3244, and an antenna 3246. For example, the PHY 3242 of the RF chip 3240 and the PHY 3140 of the application processor 3100 may exchange data with each other in compliance with DigRF interface proposed by MIPI alliance.

The electronic system 3000 may further include a working memory 3250 and an embedded/card storage 3255. The working memory 3250 and the embedded/card storage 3255 may store data received from the application processor 3100. Furthermore, the working memory 3250 and the embedded/card storage 3255 may provide the data stored therein to the application processor 3100.

The working memory 3250 may temporarily store data processed or to be processed by the application processor 3100. The working memory 3250 may include a volatile memory such as SRAM, DRAM, SDRAM, or the like, and/or a nonvolatile memory such as a flash memory, PRAM, MRAM, ReRAM, FRAM, or the like.

The embedded/card storage 3255 may store data regardless of power supply. For example, the embedded/card storage 3255 may be one of devices such as a secure digital (SD) card, an embedded multimedia card (eMMC), and/or the like.

The embedded/card storage 3255 may be implemented based on at least one of example embodiments described with reference to FIGS. 1 to 12. The embedded/card storage 3255 may include one or more nonvolatile memories and a memory controller. For example, the embedded/card storage 3255 may receive write data in the form of a plurality of data streams. Furthermore, the embedded/card storage 3255 may manage the data streams based on a data amount. According to the example embodiments, the performance of a write operation may be enhanced, and the life of the storage device 3255 may be slowly shortened or may become longer.

The electronic system 3000 may communicate with an external system through a communication module, such as WiMax 3260, wireless local area network (WLAN) 3262, an ultra-wideband (UWB) 3264, and/or the like. The electronic system 3000 may further include a speaker 3270 and a microphone 3275 for processing voice information. The electronic system 3000 may further include a global positioning system (GPS) device 3280 for processing position information. The electronic system 3000 may further include a bridge chip 3290 for managing connections with peripheral devices.

Circuits, chips, and devices according to the example embodiments of the present disclosure may be mounted using various kinds of semiconductor packages. For example, circuits, chips, and devices according to the example embodiments may be mounted using a package, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), small outline integrated circuit (SOIC), shrink small outline package (SSOP), thin small outline package (TSOP), thin quad flat pack (TQFP), system in package (SIP), multi-chip package (MCP), wafer-level fabricated package (WFP), and/or wafer-level processed stack package (WSP).

According to an embodiment of the inventive concept, the write data of data streams having the same stream ID may be stored in the same memory region. Thus, the performance of a write operation may be improved and the life reduction of the storage device may slow. Furthermore, even if data streams greater than the number of data streams which can be processed by the storage device are provided from the host, the storage device according to an embodiment of the inventive concept may efficiently manage the data streams.

The configuration shown in each of conceptual diagrams is to be understood just from the conceptual point of view. To assist in the understanding of the present disclosure, forms, structures, and sizes of each component shown in each conceptual diagram have been exaggerated or reduced. A configuration actually implemented may have a different physical shape from that shown in each conceptual diagram. Each conceptual diagram is not intended to limit the physical shape of the components.

A device configuration shown in each block diagram is provided to assist in the understanding of the present disclosure. Each block may be formed of smaller blocks according to functions. Alternatively, a plurality of blocks may form a larger block according to a function. That is, the spirit or the scope of the present disclosure is not limited to the configuration shown in a block diagram.

Above, the present disclosure has been described based on some example embodiments. However, the purpose of the present disclosure may be achieved with a different manner from the above example embodiments including the subject matters of the present disclosure according to the nature of the art. Therefore, it should be understood that the above example embodiments are in descriptive and illustrative views, rather than restrictive views. That is, the spirits or the scope that includes the subject matters of the present disclosure and that may achieve a goal of the present disclosure should be included within the spirits or the scope of the inventive concepts of the present disclosure.

Accordingly, a modified or altered technical concept without departing from the scope or the spirit of the present disclosure is included in the scope of the claims below. The scope of the present disclosure is not limited to the above example embodiments.

What is claimed is:

1. A storage device comprising:
one or more nonvolatile memories; and
a memory controller configured to control the one or more nonvolatile memories such that write data of each of a plurality of data streams is stored in the one or more nonvolatile memories, each of the data streams being associated with a corresponding requested stream identifier from among a first number of requested stream identifiers provided from a host,
wherein the memory controller comprises:
a write amount manager configured to manage information associated with a data amount of each of the data streams associated with the corresponding requested stream identifiers;
a stream manager configured to map the first number of the requested stream identifiers to a second number of processing stream identifiers, based on the information associated with the data amount, such that the data streams are provided to the one or more nonvolatile memories according to the second number of the processing stream identifiers; and
a mapping manager configured to manage information associated with mapping between the first number of the requested stream identifiers and the second number of the processing stream identifiers; and
wherein the stream manager is configured to merge data streams corresponding to at least two different requested stream identifiers when the number of requested stream identifier is greater than the number of processing stream identifier.

2. The storage device of claim 1, wherein the write amount manager is configured to obtain the information associated with the data amount by accumulating a data size of each of the data streams during one or more measurement intervals.

3. The storage device of claim 2, wherein the write amount manager is configured to calculate the data amount by summing data sizes for each of the data streams across the one or more measurement intervals.

4. The storage device of claim 2, wherein the write amount manager is configured to calculate the data amount using a weighted sum, for each of the data streams.

5. The storage device of claim 4, wherein:
the write amount manager is configured to calculate the data amount by allocating a first weight to a data size of a most recent measurement interval from among the measurement intervals, and allocating a second weight to each of a plurality of data sizes of remaining measurement intervals except for the most recent measurement interval from among the measurement intervals, and
the first weight is greater than the second weight.

6. The storage device of claim 1, wherein the write amount manager is further configured to update the information associated with the data amount when an update condition is satisfied.

7. The storage device of claim 6, wherein the update condition includes at least one of (a) a case where a write request is provided from the host, (b) a case where allocating a new memory block or restoring an invalid memory block occurs in the one or more nonvolatile memories, (c) a case where the data streams provided from the host each have a data amount that is equivalent to a reference data amount, and (d) a case where a reference time elapses.

8. The storage device of claim 6, wherein the stream manager is further configured to change the mapping between the first number of the requested stream identifiers and the second number of the processing stream identifiers, depending on the updated information associated with the data amount, and
wherein the mapping manager is configured to manage the changed mapping.

9. The storage device of claim 1, wherein:
the one or more nonvolatile memories includes a plurality of memory blocks, and
each of the plurality of memory blocks is configured to store write data of a data stream, from among the plurality of data streams, corresponding to one of the processing stream identifiers.

10. A method of operating a memory controller configured to control a plurality of non-volatile memory device including physical blocks to store data:
receiving a stream command and write data from a host in the form of a plurality of data streams, each of the data streams associated with a corresponding requested stream identifier; determining a first data amount associated with a first data stream from among the plurality of data streams having a first requested stream identifier, and to determine a second data amount associated with a second data stream from among the plurality of data streams having a second requested stream identifier, a third data amount associated with a third data stream from among the plurality of data streams having a third requested stream identifier;
merging the second stream data and the third stream data based on the amount of the second stream data and the third stream data; and
mapping the first requested stream identifier to a first processing stream identifier and both the second and third requested stream identifier to a second processing stream identifier based on the merged result, each process stream identifier configured to identify a physical block address to store write data in the non-volatile memory device.

11. A method of claim 10, wherein the first data amount is greater than the second data amount or the third data amount.

12. A method of claim 10, wherein each requested stream identifier and processing stream identifier is an integer greater than 1.

13. A method of claim 10, wherein merging operation occurs when a number of requested stream identifiers is greater than a number of processing stream identifiers.

14. A method of claim 10, wherein determining the amount of stream data corresponding to each requested stream identifier is configured respectively to accumulate each data during a first measurement time interval.

15. A method of claim 10, wherein determining the amount of stream data corresponding to each requested stream identifier is configured to sum each data during a first measurement time interval and a second measurement time interval.

16. A method of operating a memory system, the method comprising:
receiving a stream command from a host;
receiving a plurality of stream data, and a plurality of requested stream identifiers from the host, each stream identifier corresponding to each stream data,
accumulating a size of each stream date during a measurement time interval,
merging at least two different stream data having different requested stream identifier when a number of stream identifiers is greater than a number of processing stream identifiers that identify a physical address in a non-volatile memory device, mapping each requested stream identifier to a processing stream identifier; and storing the plurality of stream data corresponding to the processing stream identifier to the non-volatile memory device, wherein the number of both merged requested identifiers and non-merged requested identifiers are equal to the number of processing stream identifiers.

17. The method of claim 16 further comprising: determining an amount of data corresponding to each stream identifier during the measurement time interval.

18. The method of claim 17, wherein the merging is based on the amount of stream data when the number of requested stream identifier is greater than the number of processing stream identifier.

* * * * *